(12) United States Patent
Li et al.

(10) Patent No.: US 10,718,902 B2
(45) Date of Patent: Jul. 21, 2020

(54) LUMINESCENT PHOTONIC STRUCTURE, A METHOD OF FABRICATING A LUMINESCENT PHOTONIC STRUCTURE, AND A METHOD OF SENSING A CHEMICAL SUBSTANCE

(71) Applicant: GRIFFITH UNIVERSITY, Nathan, Queensland (AU)

(72) Inventors: Qin Li, Chapel Hill (AU); Ehsan Eftekhari, Oxley (AU); Dave Kielpinski, West End (AU)

(73) Assignee: GRIFFITH UNIVERSITY, Nathan, Queensland (AU)

( * ) Notice: Subject to any disclaimer, the term of this patent is extended or adjusted under 35 U.S.C. 154(b) by 0 days.

(21) Appl. No.: 15/736,232

(22) PCT Filed: Jun. 14, 2016

(86) PCT No.: PCT/AU2016/050487
§ 371 (c)(1),
(2) Date: Dec. 13, 2017

(87) PCT Pub. No.: WO2016/201496
PCT Pub. Date: Dec. 22, 2016

(65) Prior Publication Data
US 2018/0164502 A1    Jun. 14, 2018

(30) Foreign Application Priority Data
Jun. 15, 2015    (AU) ................................ 2015902261

(51) Int. Cl.
*G02B 6/122*    (2006.01)
*G02B 6/24*     (2006.01)
(Continued)

(52) U.S. Cl.
CPC ............. *G02B 6/1225* (2013.01); *G02B 6/24* (2013.01); *G02F 1/01* (2013.01); *B82Y 20/00* (2013.01); *B82Y 40/00* (2013.01); *G02F 2202/32* (2013.01)

(58) Field of Classification Search
CPC ........... G02B 6/1225; G02B 6/24; G02F 1/01; G02F 2202/32; B82Y 20/00; B82Y 40/00
(Continued)

(56) References Cited

U.S. PATENT DOCUMENTS

2004/0109483 A1*  6/2004  Simpson ................ B82Y 20/00
                                             372/39
2007/0297722 A1* 12/2007  Noda .................... B82Y 20/00
                                             385/50
(Continued)

FOREIGN PATENT DOCUMENTS

CN            101000949 A      7/2007

OTHER PUBLICATIONS

Krauss, Thomas F., et al., "Photonic crystals in the optical regime—past, present and future," *Progress in Quantum Electronics*, vol. 23, pp. 51-96 (1999).

*Primary Examiner* — Michael P Mooney
(74) *Attorney, Agent, or Firm* — Christensen, Fonder, Dardi & Herbert PLLC

(57) ABSTRACT

A luminescent photonic structure that comprises a luminescent material that when excited by an excitation light having a wavelength within an excitation wavelength spectrum of the luminescent material emits luminescent light having a luminescence wavelength spectrum. The luminescent photonic structure comprises a photonic crystal disposed between two other photonic crystals. The photonic crystal has a photonic lattice period within one of the luminescence wavelength spectrum and the excitation wavelength spectrum. The two other photonic crystals each have a photonic
(Continued)

lattice period within the other of the luminescence wavelength spectrum and the excitation wavelength spectrum for reflecting one of excitation light and luminescent light propagating within the photonic crystal.

18 Claims, 13 Drawing Sheets

(51) Int. Cl.
  *G02F 1/01*   (2006.01)
  *B82Y 20/00*   (2011.01)
  *B82Y 40/00*   (2011.01)

(58) Field of Classification Search
  USPC .................................................. 385/129–132
  See application file for complete search history.

(56) References Cited

U.S. PATENT DOCUMENTS

| | | |
|---|---|---|
| 2008/0246961 A1 | 10/2008 | Zhang et al. |
| 2012/0099817 A1* | 4/2012 | Quan .................... G02B 6/1225 385/33 |
| 2013/0130272 A1 | 5/2013 | Aojula et al. |

\* cited by examiner

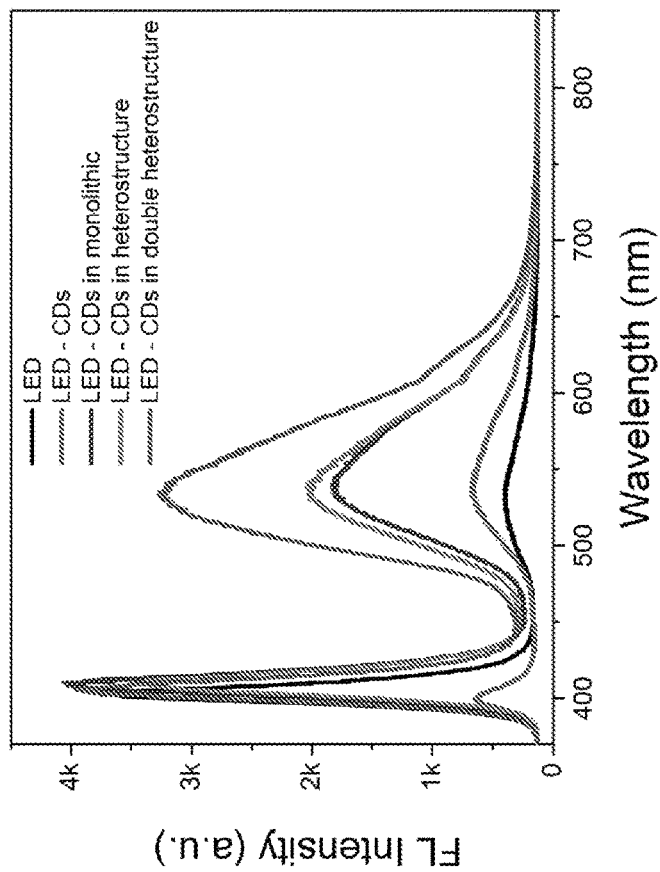
Figure 33
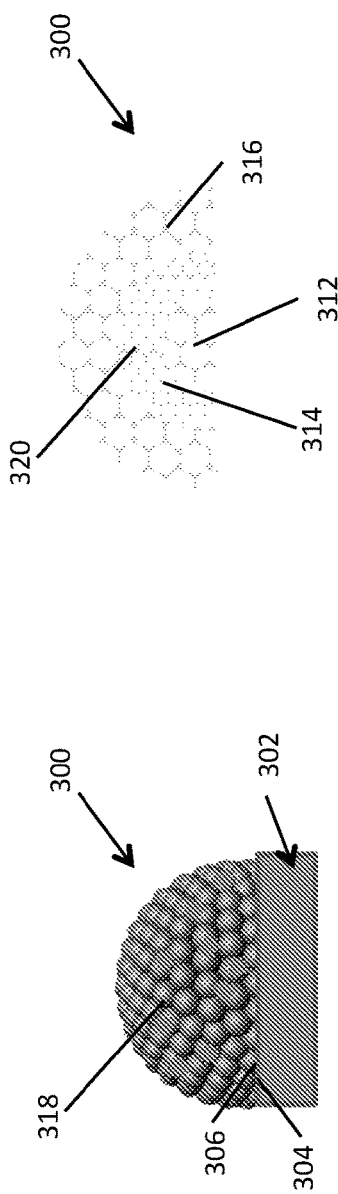
Figure 35
Figure 34

LUMINESCENT PHOTONIC STRUCTURE, A METHOD OF FABRICATING A LUMINESCENT PHOTONIC STRUCTURE, AND A METHOD OF SENSING A CHEMICAL SUBSTANCE

The present application is a National Phase entry of PCT Application No. PCT/AU2016/050487, filed Jun. 14, 2016, which claims the benefit of Australian Provisional Patent Application No. 2015902261, filed Jun. 15, 2015, which are incorporated herein by reference.

TECHNICAL FIELD

The disclosure herein generally relates to a luminescent photonic structure, a method of fabricating a luminescent photonic structure, and a method of sensing a chemical substance.

BACKGROUND

Signal intensity and signal-to-noise ratio may be generally important considerations for molecular and nanoparticle luminescence technologies, applications of which include but are not limited to chemical sensing, biochemical sensing, disease diagnostics, and environmental monitoring.

Novel photonic structures with new properties may find application in light emitting devices and optoelectronics. For example, while light-emitting diodes (LEDs) and related solid state lighting sources may be preferred over incandescent and fluorescent lighting, it may be difficult to engineer an efficient LED with a wavelength spectrum that is desired for an application. Currently, phosphors are used to convert the single emitting color of an LED to another colour or a mix of colours to produce white light, for example. Phosphors may be inefficient and may offer limited spectral shaping.

Photonic crystals (PhCs) are artificial periodic structures consisting of different dielectric materials where the index of refraction varies on length scales of the wavelength of light. The periodic dielectric contrast induces a forbidden region for electromagnetic waves, namely the photonic bandgap, or stop band for partial bandgap, which provides powerful means to control light.

SUMMARY

Disclosed herein is a luminescent photonic structure. The luminescent photonic structure comprises a luminescent material that when excited by an excitation light having a wavelength within an excitation wavelength spectrum of the luminescent material emits luminescent light having a luminescence wavelength spectrum. The luminescent photonic structure comprises a photonic crystal disposed between two other photonic crystals. The photonic crystal has a photonic lattice period within one of the luminescence wavelength spectrum and the excitation wavelength spectrum. The two other photonic crystals each have a photonic lattice period within the other of the luminescence wavelength spectrum and the excitation wavelength spectrum for reflecting one of the excitation light and the luminescent light propagating within the photonic crystal.

In an embodiment, the photonic crystal is configured for constructive multiple beam interference of the excitation light. The thickness of the photonic crystal is selected to support constructive multiple beam interference of the excitation light. The thickness of the photonic crystal satisfies $T = m\lambda \cos\theta_2$, where m is an integer, $\lambda$ is the wavelength of the excitation light, $\theta_1$ is the incident angle of the excitation light with respect to a normal of the photonic crystal, and $\theta_1$ and $\theta_2$ satisfy $$\frac{n_1}{n_2} = \frac{\sin\theta_2}{\sin\theta_1},$$

wherein $n_1$ is the refractive index of the two other photonic crystals, and $n_2$ is the refractive index of the photonic crystal. $\theta_2$ is the angle of refraction in the photonic crystal.

In an embodiment, the photonic crystal has a partial photonic band gap overlapping the luminescent emission spectrum of the luminescent material.

In an embodiment, the luminescent material comprises the photonic crystal. The luminescent material may comprise at least one of the two other photonic crystals.

In an embodiment, the luminescent material comprises a plurality of luminescent centres. The plurality of luminescent centres may be within the photonic crystal. The plurality of luminescent centres may be within the photonic crystal and the two other photonic crystals. The plurality of luminescent centres may comprise a plurality of fluorophores. The plurality of fluorophores may comprise at least one of a plurality of luminescent ions, a plurality of luminescent molecules, a plurality of luminescent nanoparticles and a plurality of up-conversion centres. The plurality of luminescent ions may comprise a plurality of lanthanide ions. The plurality of luminescent molecules may comprise a plurality of laser dye molecules. The plurality of laser dye molecules may comprise Rhodamine B.

In an embodiment, the luminescent material comprises at least one of a luminescent dye and a plurality of nanoparticles for fluorescence energy transfer (FRET).

In an embodiment, the luminescent material comprises a fluorescent sensing material. The fluorescent sensing material may comprise a fluorescent chemical sensing material.

In an embodiment, the plurality of fluorophores comprises a plurality of carbon dots adapted for sensing a chemical substance. The plurality of carbon dots may comprise a plurality of functionalised carbon dots. The plurality of carbon dots may comprise a plurality of organo-silane functionalised carbon dot. The plurality of carbon dots may comprise a plurality of mercuric ion sensitive carbon dots.

In an embodiment, the chemical substance comprises Hg(II).

In an embodiment, the photonic crystal is sandwiched between the two other photonic crystals. The photonic crystal and the two other photonic crystals may comprise planar layers. One of the two other photonic crystals and the photonic crystal may comprise spherical shells.

In an embodiment, the luminescent photonic structure is a luminescent colloidal photonic crystal structure. The photonic crystal may comprise a colloidal photonic crystal. The two other photonic crystals may comprise two other colloidal photonic crystals.

In an embodiment, the photonic crystal and other photonic crystals comprise polystyrene spheres.

An embodiment has a planar geometry.

An embodiment has a spherical geometry.

In an embodiment, the excitation wavelength spectrum overlaps a blue edge of a photonic stop band (that is, the wavelength of the shorter wavelength edge of the stop band) of each of the two other photonic crystals. The excitation wavelength spectrum may peak at the blue edge of the photonic stop band (that is, the wavelength of the shorter wavelength edge of the photonic stop band) of each of the two other photonic crystals.

In an embodiment, the luminescence wavelength spectrum overlaps a blue edge of the photonic stop band (that is, the wavelength of the shorter wavelength edge of the stop band) of the photonic crystal. The luminescence spectrum may peak at the blue edge of the photonic stop band of the photonic crystal.

In an embodiment, the photonic crystal has a leaky mode in resonance with the luminescent light.

An embodiment comprises a light emitting device. The light emitting device may be configured to emit the excitation light. The light emitting device may be at least in part within one of the other two photonic crystals. The light emitting device may be incorporated. The light emitting device may comprise a light emitting diode. The luminescent material may comprise a plurality of carbon dots. The plurality of carbon dots may be disposed in the photonic crystal. The plurality of carbon dots may be disposed in the photonic crystal and the other photonic crystal. The plurality of carbon dots may comprise a plurality of functionalised carbon dots. The plurality of functionalised carbon dots may comprise a plurality of carbon dots functionalised with 3-(imidazolidin-2-on-1-yl) propylmethyldimethoxysilane-derived moieties.

Disclosed herein is a method for fabricating a luminescent photonic structure. The method comprises the step of determining the diameter of a plurality of spheres for a photonic crystal and the diameter of another plurality of spheres for two other photonic crystals, the luminescent structure comprising:

a luminescent material that when excited by an excitation light having a wavelength within an excitation wavelength spectrum of the luminescent material emits luminescent light having a luminescence wavelength spectrum, the photonic crystal being disposed between the two other photonic crystals, the photonic crystal having a photonic lattice period within one of the luminescence wavelength spectrum and the excitation wavelength spectrum, and each of the two other photonic crystals having a photonic lattice period within the other of the luminescence wavelength spectrum and the excitation wavelength spectrum for reflecting one of excitation light and luminescent light propagating within the photonic crystal. The method comprises the step of fabricating the plurality of spheres for the photonic crystal and the other plurality of spheres for the two other photonic crystals. The method comprises the step of sequentially depositing the plurality of spheres and the other plurality of spheres. The method comprises the step of making the photonic crystal at least part of the luminescent material.

In an embodiment, the method comprises the step of making the two other photonic crystals at least part of the luminescent material.

In an embodiment, the photonic crystal is configured for constructive multiple beam interference of the excitation light.

In an embodiment, the step of fabricating the plurality of spheres for the photonic crystal and the other plurality of spheres for the two other photonic crystals comprises emulsifier free emulsion polymerisation.

An embodiment comprises the step of growing the photonic crystal and the other photonic crystal by self-assembly. The self-assembly may be horizontal self assembly.

An embodiment comprises the step of growing the photonic crystal and the other photonic crystal on a substrate.

The substrate may comprise glass. The substrate may generally be any suitable material.

An embodiment comprises the step of incorporating the luminescent centres in the photonic crystal. The luminescent centres may be incorporated in the two other photonic crystals. The step of incorporating the luminescent centres may comprise infiltrating the photonic crystal with at least some of the luminescent centres.

An embodiment comprises the step of immobilising a plurality of carbon dots on the plurality of spheres for the photonic crystal. The plurality of carbon dots may be immobilised on the plurality of spheres for the photonic crystal by diffusion and entrapment. The plurality of carbon dots may comprise a plurality of functionalised carbon dots.

An embodiment comprises the step of microfluid-assisted droplet-based self-assembly of a round photonic crystal.

An embodiment comprises the step of infiltrating the round photonic crystal with $TiO_2$ precursor sol-gel.

An embodiment comprises the step of removing polystyrene and/or triblock copolymers by calcination.

An embodiment comprises the step of using microfluidics-assisted layer-by-layer synthesis.

Embodiments of the luminescent structure may be in accordance with the above disclosure thereof.

Disclosed herein is a method for sensing a chemical substance. The method comprises the step of determining a luminescence property of a luminescent photonic structure in accordance with the above disclosure. The method comprises the step of transporting the chemical substance to the luminescence material and modifying the luminescence material with the chemical substance transported thereto. The method comprises the step of determining the luminescence property of the luminescent photonic structure with the luminescence material so modified.

In an embodiment, the luminescent property comprises at least one of fluorescence lifetime and fluorescence intensity.

In an embodiment, the step of modifying the luminescent material comprises the step of bonding the chemical substance to the luminescence material.

An embodiment comprises the step of reversing the modification of the luminescence material.

In an embodiment, the step of reversing the modification of the luminescence material comprises reversing the modification of the luminescence material with a chelating agent. The chelating agent may comprise Ethylenediaminetetraacetic acid (EDTA).

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which:

FIGS. 1-3 show various representations of an embodiment of a luminescent photonic structure.

FIG. 33 shows a plot of the emission spectra of the embodiment of FIG. 15.

FIG. 34 shows an elevational diagram of another embodiment of a luminescent photonic structure having optically coupled thereto a light emitting device.

FIG. 35 shows a cross section of the luminescent photonic structure of FIG. 34.

DESCRIPTION OF EMBODIMENTS

Figure 1:
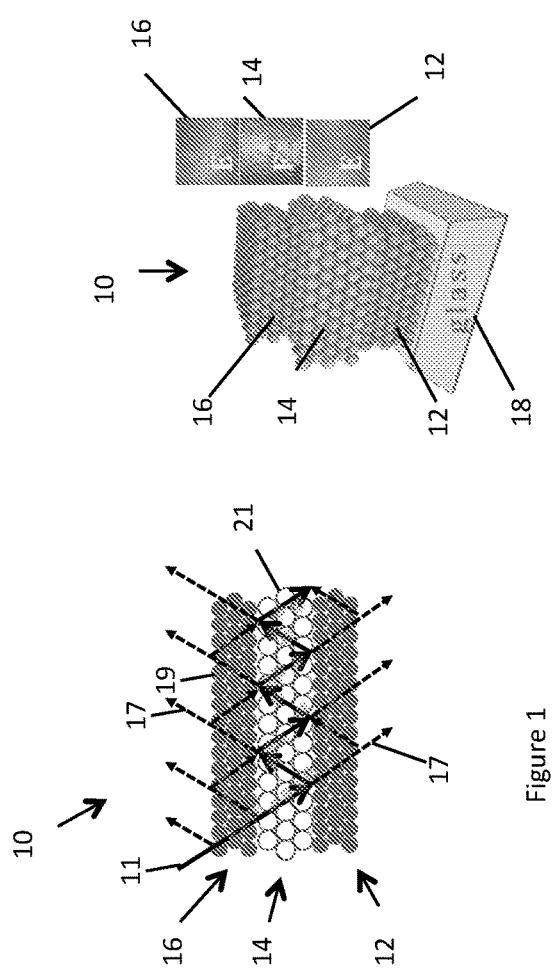

FIG. 1 shows a schematic elevational view of an embodiment of a luminescent photonic structure generally indicated by the numeral 10. The luminescent photonic structure 10 comprises a luminescent material 14 that when excited by an excitation light 11 having a wavelength within an excitation wavelength spectrum of the luminescent material emits luminescent light having a luminescence wavelength spectrum. The luminescent photonic structure 10 has a photonic crystal 14 disposed between two other photonic crystals 12, 16. The photonic crystal 14 has a photonic lattice period within the luminescence wavelength spectrum. The other photonic crystals 12,16 have a photonic lattice period within the excitation wavelength spectrum for reflecting excitation light propagating within the photonic crystal 14.

The photonic crystal 14 comprises a plurality of luminescent centres. The two other photonic crystals 12,16 also comprise luminescent centres, however no necessarily in all embodiments. The luminescent centres may be fluorophores, examples of which include molecules including but not limited to laser dye molecules, lanthanide ions including but not limited to $Nd^{3+}$ and $Yb^{3+}$, carbon dots, or generally any suitable luminescent centres. The photonic crystal 14 and other photonic crystals 12, 16 each have, in this but not necessarily in all embodiments, a colloidal photonic crystal structure ("Opal"). Colloidal photonic crystals may generally refer to photonic crystals that have uniform colloidal particles as the constituent building blocks for the ordered structure. Colloidal photonic crystals may be fabricated by bottom-up self-assembly with monodisperse submicron-particles, which may provide flexibility in fabrication.

Figure 2:
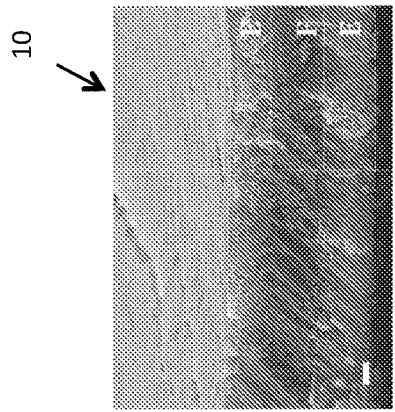

The luminescent photonic structure 10 is layered, with the photonic crystal layer 14 disposed between the other photonic crystal layers 12,16, each in the form of a slab, to form an E-F-E double heterostructure, where the F layer is the photonic crystal 14 and the E layers are the two other photonic crystals 12,16. The boundary between the layers are parallel in this but not all embodiments. FIGS. 2 and 3 are a perspective view illustration and a SEM image of the E-F-E double heterostructure of FIG. 1. The FIG. 2 insets are top-view photo images of each layer. The scale bar in FIG. 3 is 1 μm. Each of the photonic crystal 14 and the two other photonic crystals 12,16 comprise a plurality of layers, each comprising a plurality of photonic elements in the form of spheres. The photonic elements may generally take any suitable form, including cubic for example.

The photonic crystal 14 is configured for constructive multiple beam interference of the excitation light. The thickness of the photonic crystal layer 14 is selected to support constructive multiple beam interference of the wavelength of the excitation light. The thickness, T, for supporting constructive multiple beam interference satisfies $T = m\lambda \cos\theta_2$, where m is an integer, λ is the excitation (or emission in an F-E-F heterostructure) wavelength of the luminescent material, $\theta_2$ is the angle of refraction in the photonic crystal. $\theta_1$ is the incident angle to the middle photonic crystal layer 14 with respect to normal. The relationship between $\theta_1$ and $\theta_2$ is $$\frac{n_1}{n_2} = \frac{\sin\theta_2}{\sin\theta_1},$$

where $n_1$ is the refractive index of top photonic crystal, and $n_2$ is the refractive index of the middle photonic crystal. The two other photonic crystal layers 12, 16 both reflect any excitation light that may propagate in the photonic crystal layer 12. Hence, when the thickness of the photonic crystal layer 12 supports constructive interference, the excitation light is effectively recycled many times through the photonic crystal layer 14, increasing the excitation efficiency. The cavity of this resonator (the photonic crystal layer 14) has a colloidal photonic crystal structure with a partial bandgap overlapping the luminescence emission wavelength, which is a strong resonator of the emission light. FIG. 1 shows a schematic of the multiple-beam interference effect in the colloidal photonic crystal structure E-F-E double heterostructure.

In an alternative embodiment, the photonic crystal 14 has a photonic lattice period within the excitation wavelength spectrum, wherein the other two photonic crystals 12,16 have a photonic lattice period within the luminescence wavelength spectrum for reflecting the luminescent light propagating within the photonic crystal 14.

Returning to the embodiment of FIG. 1, a Bragg diffraction model predicts that a partial bandgap occurs at $$\lambda = 2\sqrt{\frac{2}{3}} \cdot D \cdot \sqrt{n_{eff}^2 - \sin^2\theta},$$

where λ is the stop band wavelength, D is the diameter of the constituent spheres, and nay is the effective refractive index of the colloidal photonic crystal structure, and θ is the angle between the incident light and the lattice planes. The latter is estimated by $n_{eff}^2 = \Sigma f_i n_i^2$, with constant filling fractions ($f_i$) of 0.74 for a polystyrene phase and 0.26 for air.

The excitation light is transversely directed with respect to the luminescent photonic structure 10.

The luminescent photonic structure 10 synergistically combines a photonic effect with a multiple beam interference effect. The other photonic crystals 12,16 are not merely reflectors, but are integral to the luminescent photonic structure 10 and synergistic with the photonic crystal 14 in way that mere reflectors cannot be:

1. The top E layer 16 exhibits stimulated excitation due to the overlap of stop band (preferably on blue edge) with the fluorophore excitation peak. Moreover, the emitted light is directionally emitted due to the mirror effect of the underlying F layer, which forbids luminescence to enter F layer.
2. In the middle F layer 14, the excitation light recycles many times owing to the Bragg's mirror effect due to the top and bottom E layers, thereby enhancing light utilization.

Fabrication

Fabrication of the embodiment of FIGS. 1-3 is now described. Polystyrene spheres 19,21 for the other photonic crystal layers 12,16 and the photonic crystal layer 14 were synthesized using emulsifier free emulsion polymerization synthesis. The spheres 29,31 comprise any suitable material, for example another polymer or ceramic. The spheres for the two other photonic crystals 12,16 have a diameter of 230±5 nm and the spheres for the photonic crystal 14 have a diameter of 310±5 nm to match the excitation and emission maxima of the luminescent centers, in this embodiment Rhodamine B. A colloidal suspension of polystyrene spheres was centrifugally purified. Mono layers of photonic crystals 12,14,16 were grown by horizontal self-assembly on a glass substrate in the form of a micro glass substrate. Double heterostructure photonic structures (E-F-E and F-E-F) can be fabricated on the glass by sequential horizontal deposition.

For some embodiments described herein including that of FIGS. 1-3, Rhodamine B fluorophores were dispersed in a solvent in the form of ethanol ("the dispersion"). The excitation of Rhodamine B was measured at 460 nm wavelength, the Rhodamine B dispersion gives off the strongest fluorescent emission at 610 nm. The dispersion was infiltrated into the photonic crystal 14 and the two other photonic crystals 12,16, which where subsequently air dried to remove the solvent. Any suitable luminescent center may be used.

Alternative methods of making the photonic crystal 14 and the two other photonic crystals 12, 16 may generally be used, as suitable, examples of which include but not limited to lithography, and multiphoton polymerisation.

In another embodiment, polystyrene spheres of 185±5 nm (for the two other photonic crystals 12,16) and 230±5 nm (for the photonic crystal 12) were synthesized for matching the excitation and emission wavelength of carbon dots. carbon dots were immobilized on the 230 nm polystyrene spheres by diffusion and entrapment. In detail, a polystyrene dispersion (5 vol %) was centrifugally purified. Then, 3.9 mmol of carbon dots dispersed in dimethyl formamide (DMF) was added drop-wise to 2 ml of washed 230 nm polystyrene dispersion. Finally, carbon dots immobilised polystyrene spheres were washed and centrifugally purified to remove excess carbon dots. The tri-layer double heterostructure were formed by successive self-assembly of E, F and E layers. The E layers are colloidal photonic crystal structures with polystyrene spheres of 185 nm, and the F layer is a colloidal photonic crystal structure having immobilised carbon dots.

Measurement

Figure 4:
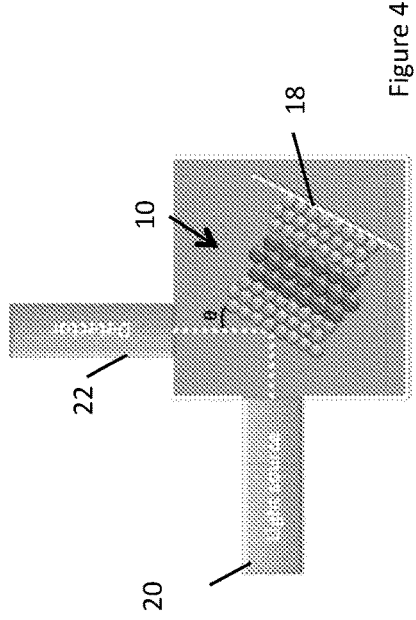
FIG. 4 shows an example of an apparatus for measuring the luminescence of the luminescent photonic structure of FIG. 1.

Polystyrene particle hydrodynamic size and polydispersity were measured on a Malvern Zetasizer Nano ZS, and particle size was determined by SEM. The surface morphology of the luminescent photonic crystal structure 10 was examined using a JEOL 7001 scanning electron microscope (SEM), operating at 15 KV. UV visible (UV-Vis) absorption spectra were measured on an Agilent 8453 UV-Vis spectrometer. Fluorescence emission spectra were measured using a Thermo Scientific Lumina fluorescence spectrometer at 600 V excitation power, to prevent bleaching of Rhodamine B. The incidence and observation light paths of the fluorescence spectrometer are perpendicular to each other, and the sample was placed in a position where both incidence and observation angles are of 0=45° to the normal direction. As shown in FIG. 4, a laser light source 20 generated a laser spot on the sample approximately 5 mm² broad. The decay rate of the luminescence of the Rhodamine B in the colloidal photonic crystal structures were measured on a detector 22 in the form of Edinburgh Photonics FLS920 22 with 450 nm 100 ps pulsed laser excitation source.

The cross-sectional SEM images displayed in FIG. 3, shows the double heterostructure configuration and the congruent interfaces. The E layer particle size (230±5 nm) is less than the underlying F layer particle size (310±5 nm), which further decreases the mobility of E particles because the smaller particles are locked in the tetrahedral sites formed by the larger particles in the F layer.

Figure 5:
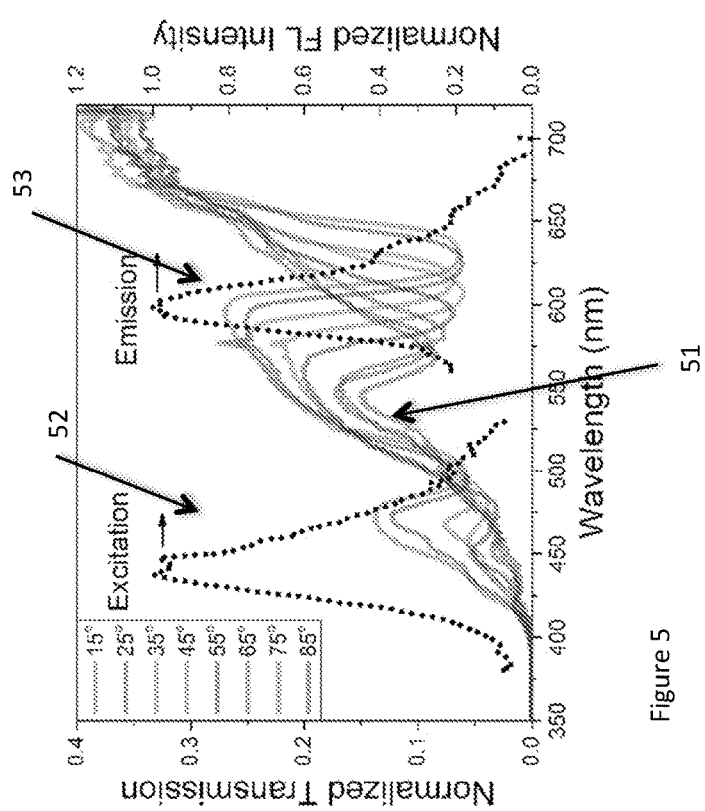

FIG. 5 shows a graph of normalized UV-visible transmission of the photonic luminescent structure 10 as a function of incident angle overlaid with the normalized photoluminescence (PL) excitation and emission spectra of Rhodamine B (a 1 μM concentration in a solvent in the form of ethanol) in an amorphous polystyrene control sample. FIG. 5 shows the angle-dependent dual stop bands (51) of the luminescent photonic structure 10 (thickness of each layer is 2.5 μm) and their relative positions with reference to the excitation (52) and the emission (53) of Rhodamine B. The spectra pattern of the dual stop bands suggests that morphology defects in the top E layer do not have a significant influence on optical performance. The Rhodamine B excitation peak (centred on 440 nm) is on the blue edge of the E stop band (that is, the wavelength of the shorter wavelength edge of the E stop band, which is located at 590 nm, and that the emission peak falls on the blue edge of the F stop band (that is, the wavelength of the shorter wavelength edge of the F stop band) when the incident angle is from 15°-35°. When the absorption of a material overlaps the stop band blue edge, there exists an enhanced light-matter interactions due to the local density of states (LDOS) in the photonic crystal 14 When a fluorophore emission peak is on the blue edge of the photonic bandgap there is an enhanced emission intensity accompanied by an accelerated emission rate.

Figure 6:
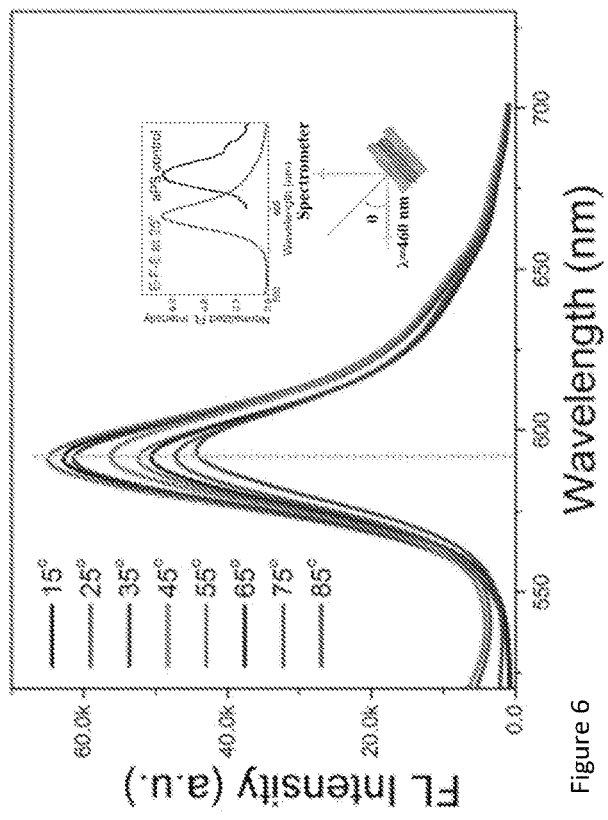
FIG. 5-17 show results from various measurements of embodiments of luminescent photonic structures.
Figure 8:
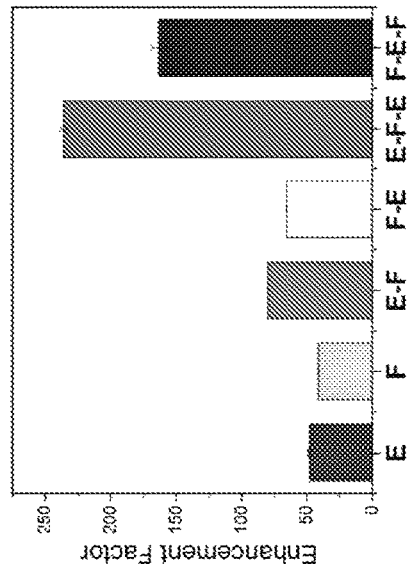
Figure 7:
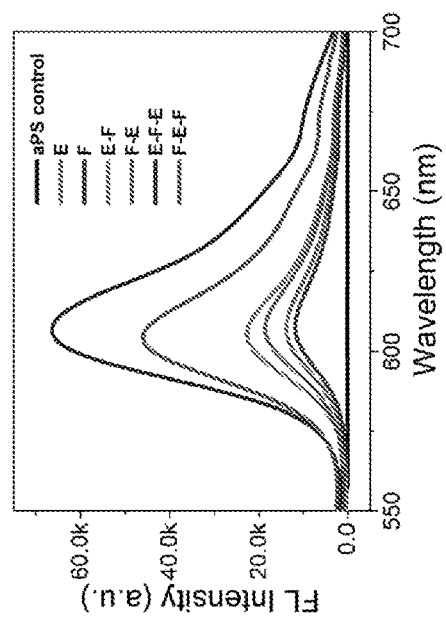
Figure 10:
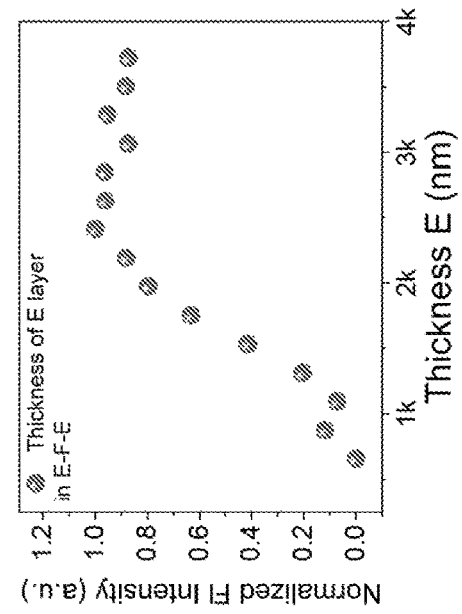
Figure 9:
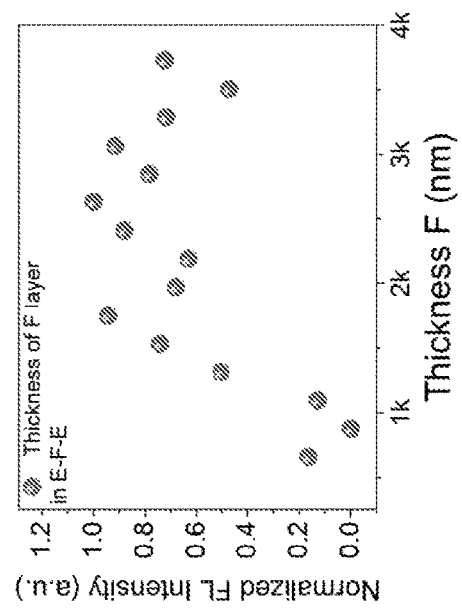

FIG. 6 shows a fluorescence spectra of Rhodamine B in the luminescent photonic structure 10 as a function of incident angle. A same thickness polystyrene film formed by polystyrene spheres in disordered fashion infiltrated with the same quantity of Rhodamine B dye is employed as a reference sample ("amorphous polystyrene" or "aPS"). The inset of FIG. 6 shows normalized fluorescence spectra of amorphous polystyrene and the photonic luminescent material at 25 degrees Celsius. The E-F-E structure was infiltrated with Rhodamine B dye (20 μL of the dispersion, at a concentration of 1 μM) and exhibited strong fluorescence under 460 nm excitation. The dispersion has the strongest fluorescence emission at 610 nm. The emission of Rhodamine B in the photonic luminescent material 10 as a function of the incident angle θ are shown. The emission maxima of the Rhodamine B-dropcast amorphous polystyrene film is at 639 nm, whereas the emission peak of Rhodamine B in E-F-E is blue-shifted to about 590 nm. This may be attributed to the spectral reshaping function of colloidal photonic crystals arising from the redistribution of the photon density of states. Nevertheless, it is surprising that the incident angle variation did not result in considerable emission spectra positional shift. This effect may be caused by the large spot size of the excitation incident beam, ~5 mm² size, which resulted in an averaged effect of many crystal domains and facets. On the other hand, the fluorescence intensity shows an obvious dependence on the incident angle as displayed in FIG. 6. An incident angle of 25° resulted in the highest fluorescence intensity, which is about 40% higher than the lowest fluorescence intensity at an angle of 85°. A unconventional feature of such an E-F-E structure is that the fluorescence would not be totally inhibited at any incident angle, because the emitters are present in all layers (most relevantly, the top E and F layers). For example, when the incident angle is between 35° to 45° (observation angle 55° to 45°), although for the F layer it may exhibit inhibited emission, the top E layer is still able to emit with the assistance of the underlying F layer's Bragg's reflection to the emission wavelength at its best performance. FIG. 7 shows a fluorescence spectra for Rhodamine B-infiltrated monolithic three dimensional colloidal photonic crystal structures of E and F, heterostructures of E-F and F-E and double heterostructures of E-F-E and F-E-F. A control is Rhodamine B on amorphous polystyrene. FIG. 8 shows fluorescence enhancement factors for all samples, measured as the ratio of fluorescence intensity maxima between the sample and the control. FIG. 9 shows the effect of F layer thickness on Rhodamine B fluorescence intensity in a E-F-E double heterostructure. FIG. 10 shows the effect of E layer thickness on Rhodamine B fluorescence intensity in a E-F-E double heterostructure.

Figure 12:
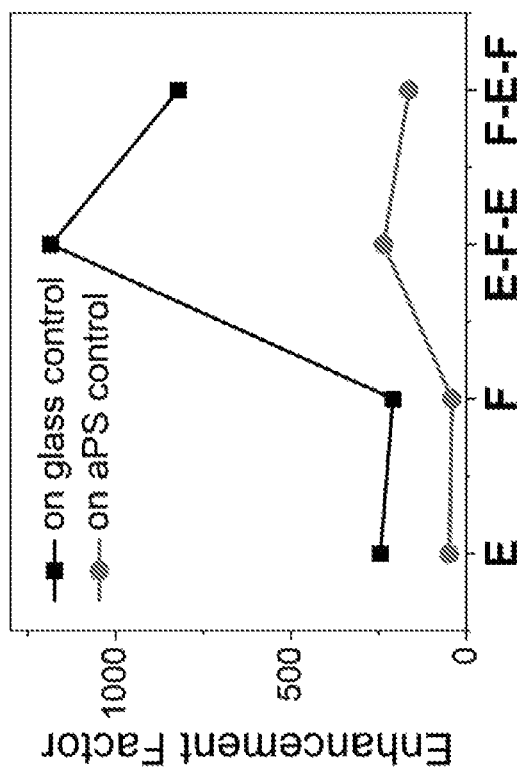
Figure 11:
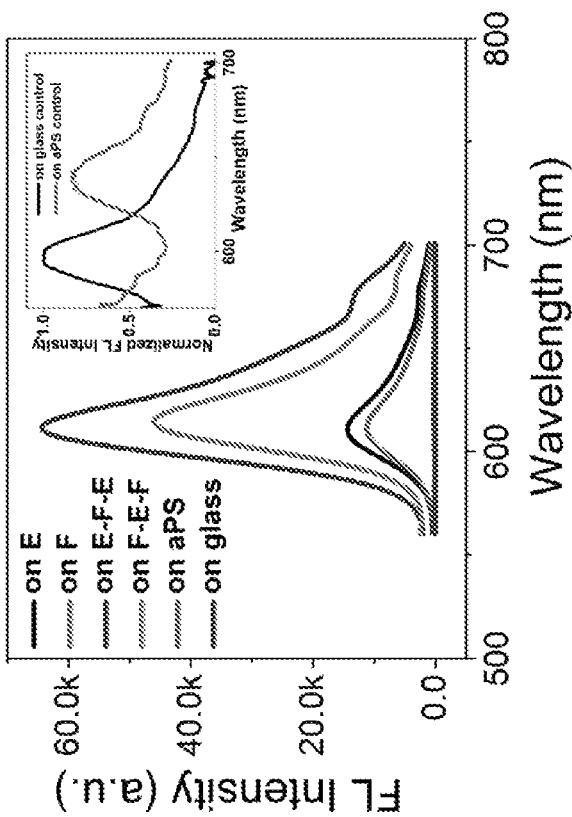

The evaluation of fluorescence emission enhancement in colloidal photonic crystal structures may be achieved using a control sample that ideally should have the same structural and chemical environment as the specimen of interest. In this study, the applicant selected Rhodamine B spread on the amorphous polystyrene film of the same thickness as the reference, because it enables us to cancel out the effect of Rhodamine B-polystyrene molecular interactions. The fluorescence enhancement factors relative to Rhodamine B on glass are presented in FIG. 7, which shows a 1031-fold increase of E-F-E. FIG. 11 shows fluorescence spectra for E, F and double heterostructure E-F-E and F-E-F compared to two control samples of Rhodamine B on amorphous polystyrene polystyrene and Rhodamine B on the glass (glass control). The inset of FIG. 11 is the normalized fluorescence spectra of glass and amorphous polystyrene control samples. FIG. 12 shows the fluorescence enhancement factors for E, F E-F-E and F-E-F for a glass substrate and a amorphous polystyrene control sample.

In the monolithic E colloidal photonic crystal, the excitation light is coupled to the stop band, leading to enhanced excitation, while in the monolithic F colloidal photonic crystal structure, it is the emission light that is coupled to the stop band, resulting in coherent scattering. The quality factors of the two types of monolithic colloidal photonic crystal structures are similar, around 40-fold enhancement (compared to amorphous polystyrene control) with E slightly better than F, consistent with other reports.

The E-F-E double heterostructure exhibited a remarkably high fluorescence enhancement factor of 260 relative to Rhodamine B on amorphous polystyrene, which is more than six-fold of that of the monolithic colloidal photonic crystal structures, namely E and F. Such an intensity enhancement effect is surprising, because with an E layer on top and the incident light shone from the top, intuitively one would expect that very little excitation light (about 8% according to the UV-vis transmission data in FIG. 5 in this case) would pass through E layer and enter into F layer. Optical resonance effects cause an intensity enhancement. The enhanced performance of the photonic luminescent structure 10 arises because the two E layers form an optical resonator for the excitation light, enhancing the excitation intensity in the F layer and thus the fluorescence intensity. As expected by multiple beam interference theory, the Rhodamine B fluorescence intensity in E-F-E is the highest when the F layer thickness supports constructive interference. The fluorescence dependency on the thickness of F layer is shown in FIG. 9. The undulating pattern of the Rhodamine B fluorescence intensity when F layer thickness varies in E-F-E structure confirms the multiple-beam interference effect. In contrast, when F layer thickness varies, the fluorescence intensity only increases in a monotonic manner. Moreover, as shown in FIG. 10, when the thickness of the E layer increased, it initially resulted in improved enhancement in fluorescence intensity of E-F-E until reaching a maximum before showing a gradual decreasing trend. When the thickness of E layer increases, initially its strength as a Bragg reflector increases though the transmission of the excitation light decreases, and the gain in fluorescence intensity benefits more from the improved multiple beam interference compared to the loss in transmitted light through top E layer; such a gain in Bragg's reflector strength accompanied by a loss in transmission through E means that there exists an optimum thickness for emission intensity as demonstrated in FIG. 10.

Basic resonator theory predicts an enhancement factor of $S_{EFE}=S_F/T_E$, where $T_E$ is the stop band transmission of the E layer, approximately 7.9%. However, scattering losses in the F layer reduce the enhancement factor to:

$$S_{EFE} = S_F \frac{T_E}{[1-(1-T_E)(1-A_F)]^2}$$

where $A_F$ is the fraction of intensity lost in a single pass through the F layer. FIG. 6 shows that the E-F-E double heterostructure, which is two times thicker than the F layer alone, has a passband transmission that is 3% lower than the F layer. Hence $A_F \approx 1.5\%$, theoretically yielding about 9× enhancement compared to F layer alone. The reason that only 6× enhancement (relatively to F layer) was experimentally observed is likely due to scattering loss and the imperfection of the colloidal photonic crystal structure. The F-E-F double heterostructure exhibits a lower enhancement of 4× relative to E layer alone, arising from similar multiple-beam interference effects, this time for the fluorescence light. From FIGS. 5 and 6, the scattering loss at the fluorescence wavelength appears slightly larger than at the excitation wavelength, which may account for this effect.

Figure 13:
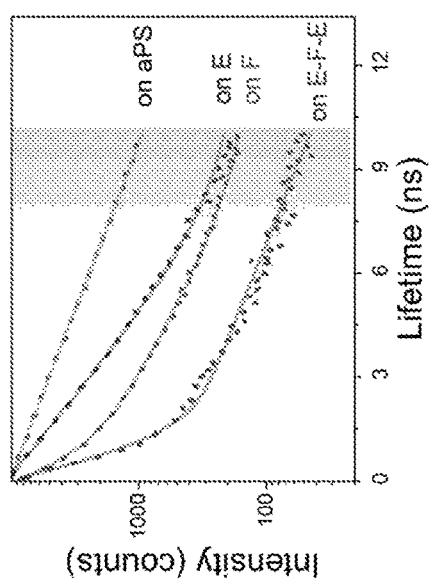

We further investigated the effect of E-F-E double heterostructure on the fluorescence emission lifetime to understand the origin of such a strong fluorescence enhancement. Photonic crystals can modify the radiative lifetime due to the redistribution of density of states (DOS). Since the Rhodamine B PL intensity in E-F-E is the highest at the incident angle of 25°, the applicant selected this orientation for detailed fluorescence dynamics analysis. The Rhodamine B emission decay curves of Rhodamine B in a amorphous polystyrene control, monolithic colloidal photonic crystal E and F, and double heterostructure E-F-E at the incident angle of 25° are shown in FIG. 13. Apart from Rhodamine B on amorphous polystyrene, the decay curves of Rhodamine B in all colloidal photonic crystal structures show typical nonexponential time-resolved emission observed in photonic crystals, which can all be fitted with a biexponentail function. Emission of Rhodamine B in the monolithic E colloidal photonic crystal appears to have two emissive components: one with a lifetime constant of 3.83 ns and a percentage of 13.3%, likely arising from the same origin as Rhodamine B on amorphous polystyrene (lifetime 4.59 ns), and one faster emission component with a lifetime constant of 1.77 ns contributing 86.70% of the total photon counts. Rhodamine B in F shows a similar dynamics with a slow emission (3.7 ns, 29.9%) sharing the same origin as Rhodamine B on amorphous polystyrene, and a fast emission (0.58 ns, 70.1%) likely due to photonic structure. The difference between Rhodamine B in E and F is that the emission in F is much further accelerated than Rhodamine B in E. Such an outcome is plausible, because at the incident angle of 25°, the intrinsic fluorescence of Rhodamine B overlaps the blue edge of the stop band of F; It has been shown that such a coupling results in much enhanced radiative rate. On the other hand, the shorter lifetime component observed in E is still under investigation. Fitting of the emission decay curve of Rhodamine B in E-F-E shows two emission components with a long lifetime of 4.1 ns (5%) similar to Rhodamine B on amorphous polystyrene, and a short one of 0.41 ns (95%). It is an extraordinary further acceleration compared to $\tau_2$ of Rhodamine B in E. Fluorophores may experience restrained non-radiative relaxation in photonic crystal matrix, which interfere with the propagation of elastic waves. This may have also contributed to the dramatically increased quantum efficiency and change in lifetime constant.

Figure 17:
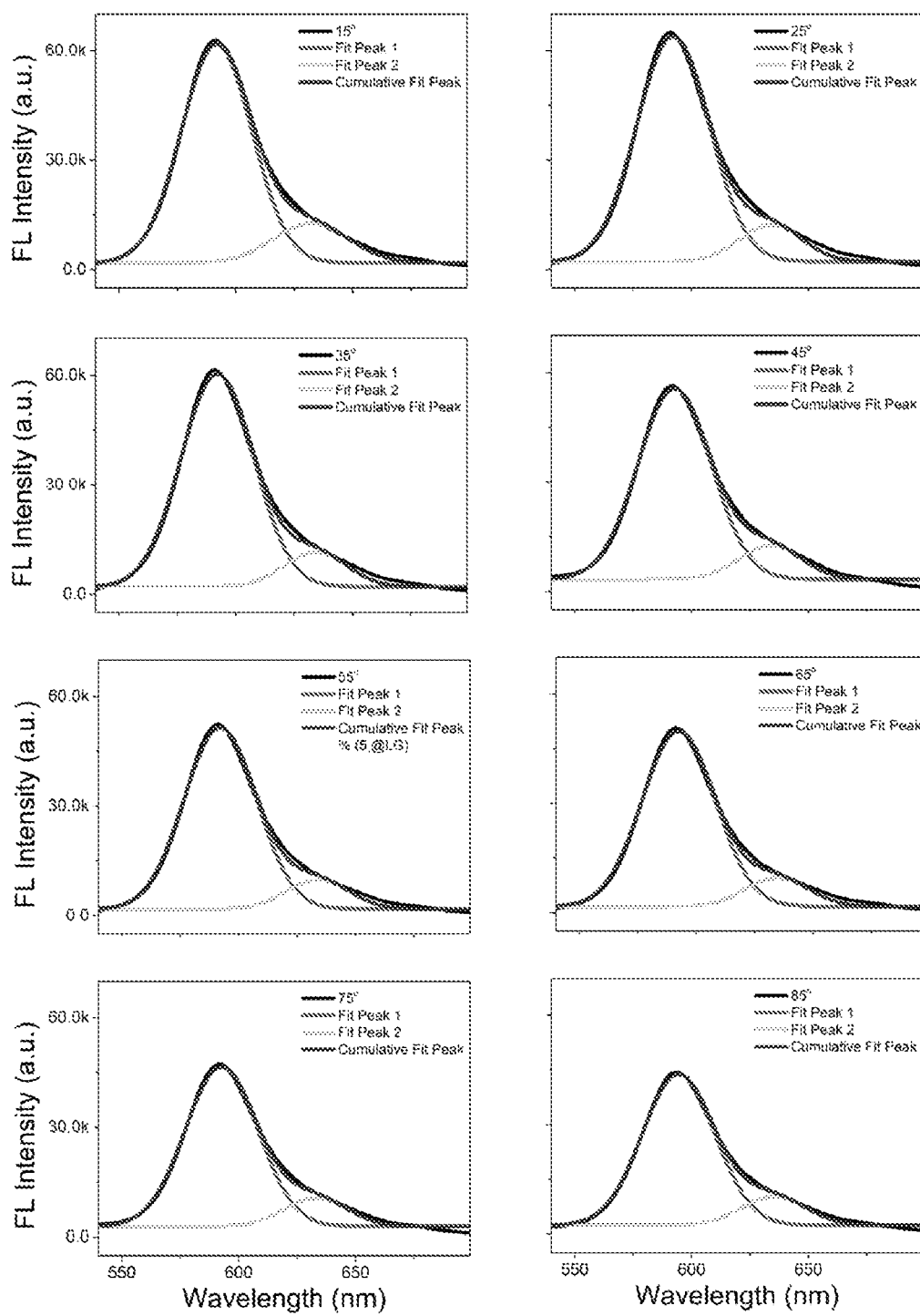

The two components of emission observed from time-resolved fluorescence analysis fit well with the static fluorescence spectra. A small peak centred around 630 nm can be distinguished on the angle-dependent Rhodamine B static emission spectra by performing peak-splitting. FIG. 17 shows that the static fluorescence spectra at all angles can be split into two peaks, indicating at least two types of emissions. The spectral position of the small peak coincides with the emission maxima of Rhodamine B on amorphous polystyrene, which suggests that this component of emission originates from the Rhodamine B dye on the very top of the double heterostructure colloidal photonic crystal, whose intensity is enhanced due to coupling with the leaky mode, however, without changes in emission lifetime. On the contrary, the major peak centred around 590 nm appears to be originated from the Rhodamine B dyes inside colloidal photonic crystals, which is more sensitive to the change of incident angle. The emission lifetime of this component is significantly changed by the photonic effect.

Figure 14:
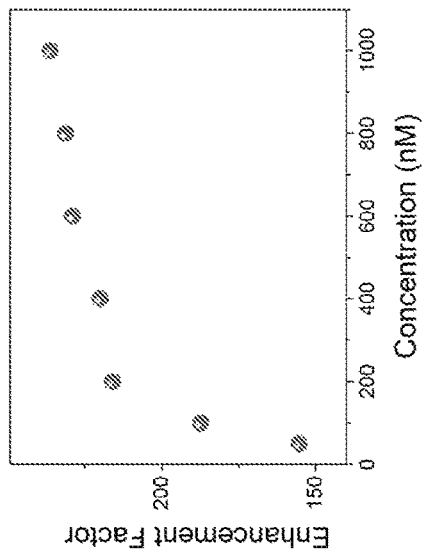
Figure 16:
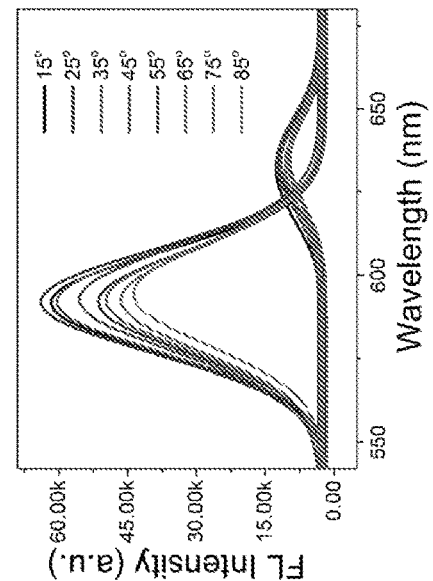
Figure 15:
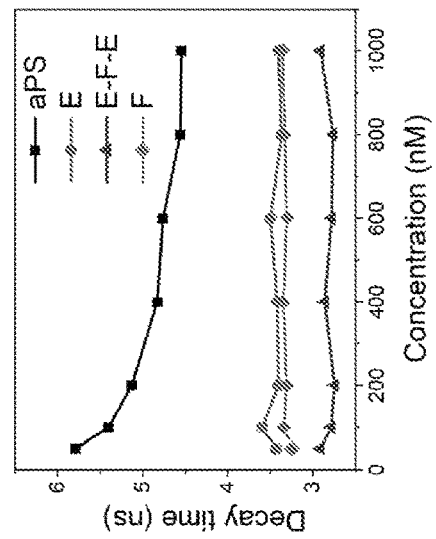

To further verify whether the fluorescence modulation is due to photonic effect, the applicant also studied the dependence of the enhancement factor and decay time constant on the concentration of Rhodamine B molecules. FIG. 14 shows the enhancement factor of Rhodamine B on double heterostructure E-F-E at 25° with different Rhodamine B concentrations. FIG. 15 shows averaged lifetime constants of Rhodamine B on amorphous polystyrene, on monolithics colloidal photonic crystal structures E and F, and on double heterostructure E-F-E at 25° with different Rhodamine B concentrations. FIG. 16 shows angle-dependent static emission spectra split into three peaks, showing an angle-independent minor component with a peak position of Rhodamine B on amorphous polystyrene. The original Rhodamine B solution was diluted with ethanol with different concentrations. As shown in FIG. 14, the enhancement factor increased from 160 times to 260 times as the Rhodamine B concentration increase. When the concentration increased from 0 to 200 nM, there was a rapid fluorescence increment. When Rhodamine B concentration increased further till 1 µM, the increase rate of fluorescence was slower. In the decay time comparison as shown in FIG. 15, the averaged decay times for Rhodamine B in various colloidal photonic crystal structures were used. The decay constant of Rhodamine B on amorphous polystyrene rapidly decreased from 5.8 ns to 4.8 ns when Rhodamine B concentration increased from 10 nM to 400 nM, followed by a stabilized regime with an average around 4.6 ns. Such a decrease in fluorescence lifetime may be caused by the energy transfer among dye molecules as the concentration increased. On the contrary, for Rhodamine B in E, F, and E-F-E, the emission lifetime remained constant, further confirming the observed modified lifetimes in colloidal photonic crystal structures are due to the photonic effect.

Figure 19:
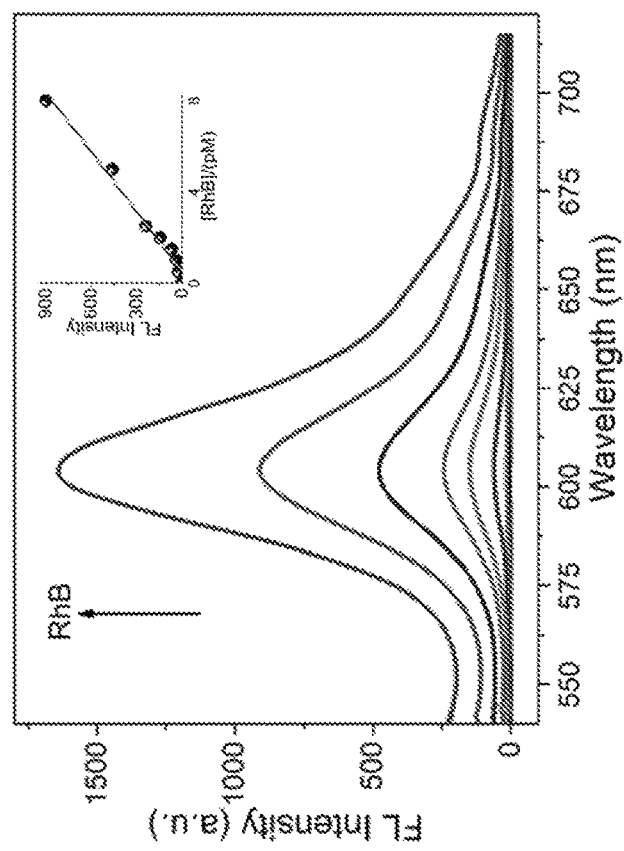
FIG. 19 shows the fluorescence signal of Rhodamine B of various concentrations within an E-F-E structure.
Figure 18:
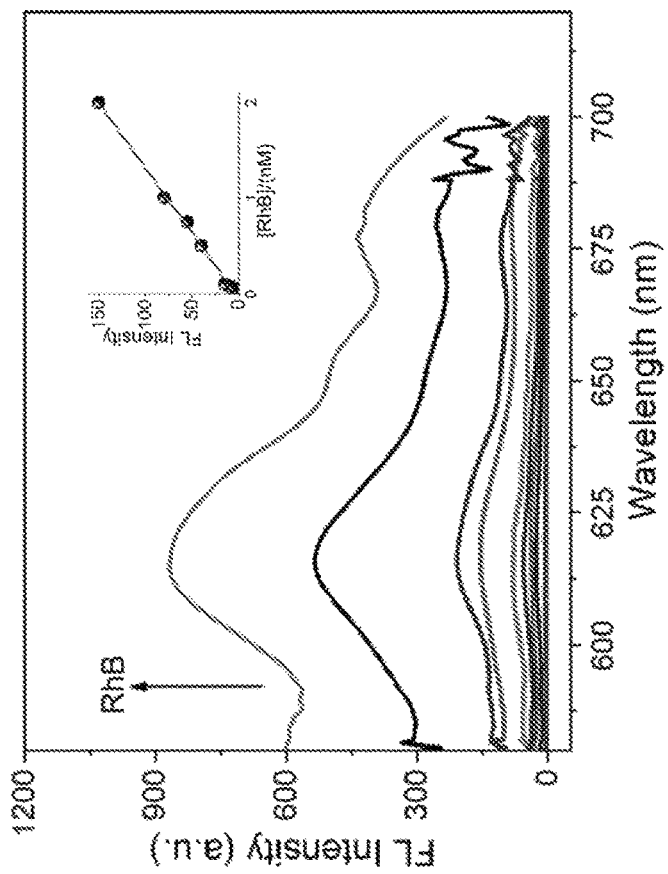
FIG. 18 is a graph of the fluorescence signal of Rhodamine B of various concentrations deposited on glass substrates.

FIG. 18 is a graph of the fluorescence signal of Rhodamine B of various concentrations deposited on glass substrates, the inset being a concentration-dependent fluorescence linear regression. FIG. 19 is the fluorescence signal of Rhodamine B of various concentrations deposited on the E-F-E film, the inset being a concentration-dependent fluorescent linear regression. The fluorescence enhancement enables us to detect the presence of Rhodamine B with relatively more sensitivity. The detection limit of Rhodamine B in E-F-E has been decreased from 37 pM on glass to 18 fM, more than three orders of magnitude reduction. It can be envisioned that if a double heterostructures having µm dimensions, and incorporating surface patterning to promote analyte concentration, may yield extremely high sensitivity and accuracy.

In summary:
  When luminescent centres are incorporated in the photonic crystal 14 (middle F layer), so that the top and bottom E layers 12,16 only function as reflectors, the intensity enhancement efficiency is much lower than having the luminescent centres distributed throughout the photonic crystal 14 and the two other photonic crystals 12,16 (E-F-E structure). In these embodiments, the function of the top and bottom layers is more than merely being Bragg's mirrors.
  The fluorescence lifetime studies show that embodiments of luminescent photonic structures have a significantly altered spontaneous emission rate, specifically 0.41 ns in comparison with 1.77 ns and 0.58 ns for Rhodamine B in E and F alone, respectively. If the E layers 12,16 only functioned as Bragg's mirrors, they wouldn't change the emission lifetime.
  Embodiments of luminescent photonic structures combine the multiple beam interference effect with a photonic effect. The photonic crystal 14 (F layer) may be viewed as a planar defect in a structure having a single other photonic crystal (12 or 16).

Upconverting Luminescent Material

In some embodiments, the luminescent material may be a luminescent up-conversion material. Up-conversion (UP) is the nonlinear optical processes whereby electrons in a valence band absorb two or more pump photons via relatively long-lived intermediate energy states, reaching a higher energy level, which can result in radiative decay emitting a higher energy photon compared to the excitation photon energy. When coupled with semiconductor materials, such as Black $TiO_2$, the electrons of lanthanide ions can absorb two or three sub-bandgap photons, reaching a higher energy level, and directly inject into the conduction band of B—$TiO_2$, inducing electron transfers. A fraction of the multi-photon excited electrons could also relax to the ground state, emitting a higher energy photon in the visible. Though the emitted visible photon may also excite B—$TiO_2$, causing charge-hole separation, it is a much less efficient pathway.

The equation that describes the upconverting (UP) emission intensity can be borrowed for understanding the influencing parameters on quantum efficiency (QE):

$$I=\phi \cdot \sigma_s \cdot \eta_{ET} \cdot \varphi_A$$

where, $\phi$ is the photon flux of the incident radiation, $\sigma_s$ is the absorption cross-section of the sensitizer ion (in our system $F^-$), $\eta_{ET}$ is the energy-transfer efficiency from the sensitizer to the activator (the La ions), and $\varphi_A$ is the luminescence quantum yield of the activator. The four parameters have equal weighting in determining the up-conversion QE. QE may be improved by augmenting photon flux $\phi$ by employing the colloidal photonic crystal structures disclosed herein.

Three example doping strategies are follow.

Method 1: The applicant selected $NaGdF_4$:Yb,Er up-conversion nanoparticles as a doping agent for a $TiO_2$ matrix. The $NaGdF_4$:Yb,Er nanoparticles of 2-8 nm is mixed with a typical $TiO_2$ precursor and copolymer Pluronic F127 to form a clear sol solution for sol-gel process assembly. A homogeneously doped mesoporous $TiO_2$ network may be formed without compromising on the inverse opal spheres (iOSs) mechanical robustness.

Method 2: Site impregnation: Introducing up-conversion nanoparticles after inverse opal sphere formation, whereby the $NaGdF_4$:Yb,Er up-conversion nanoparticles may be evenly distributed on all surfaces of the inverse opal sphere by diblock copolymer templating. The capillary force may be selected to make the up-conversion nanoparticles locate at different layer of the multilayered structure.

Method 3: Direct addition of lanthanide oxides and the doping elements into $TiO_2$ precursor for co-assembly with amphiphilic block copolymer to form homogeneous mesoporous composite frameworks. During calcination, up-conversion nanoparticles and $TiO_2$ anatase can be co-crystallized in-situ. The size and location of the nanoparticles can be controlled by the phase separation approach.

The photon flux $\phi$ may be enhanced as illustrated by the light propagation in double heterostructure round photonic crystals.

Spherical Luminescent Photonic Structure and Sensing Applications

Figure 20:
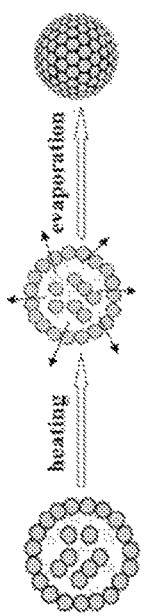
FIG. 20 shows a sectional view of another embodiment of a luminescent photonic structure.

FIG. 20 shows a schematic of a spherical luminescent photonic structure 30 analogous to the planar luminescent photonic structure 10 of FIG. 1. The spherical structure 30 may be fabricated as follows.

Figure 21:
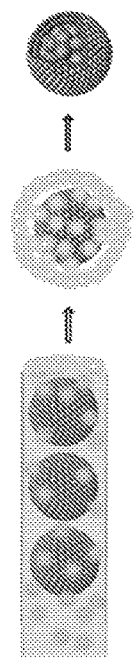
FIG. 21 shows an example of controlling the size of the luminescent photonic structures of FIG. 20.

Step 1. Fabrication of colloidal crystal spheres (CCS) and their $TiO_2$ inverse opal structure: Firstly, a microfluidics-assisted droplet-based self-assembly method fabricates the colloidal crystal spheres, where the constituent particles are monodispersed polystyrene submicron particles. As shown in FIG. 21, the size of the colloidal photonic crystal spheres can be controlled by the concentration of polystyrene colloidal suspension and the droplet size. The drying rate may influence the quality of the round photonic crystals.

Afterwards, the round photonic crystals are be infiltrated with $TiO_2$ precursor sol-gel, typically titanium isopropoxide and Pluronic triblock copolymer (for templating mesopores) mixed in ethanol. To avoid surface capping, a common problem encountered in $TiO_2$ inverse opal fabrication, the applicant used a tube-in-tube microfluidics fabrication method for removing the excessive $TiO_2$ precursor on the spheres' surfaces. The polystyrene balls (for macropores) and triblock copolymers are removed by calcination.

Figure 22:
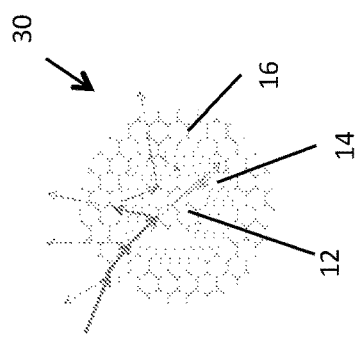
FIG. 22 shows an example of fabricating the luminescent structure of FIG. 6.

Step 2. Fabrication of multilayered CCSs. A microfluidics-assisted layer-by-layer synthesis method is used for fabricating multilayered colloidal crystal spheres. As illustrated in FIG. 22, the round photonic crystals can be dispersed in a 2nd colloidal suspension which is comprised of monodisperse polystyrene spheres of the desired size. Consideration of the wettability of round photonic crystals and dispersion solvent may be desirable, because the round photonic crystals are superhydrophobic structures. In addition to surface treatments such as UV activation or oxygen plasma irradiation, which may improve the wettability, selection of a most suitable solvent may also be necessary. The thickness of the 2nd layer may be controlled by the concentration of the colloidal suspension and the droplet size. Additional layers can be successively added to the round photonic crystals following the same methodology.

Figure 24:
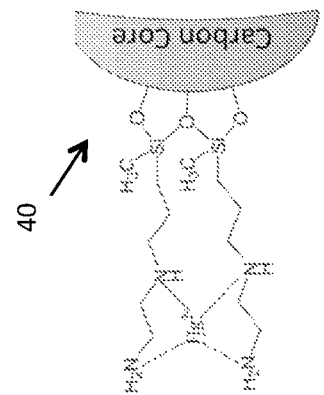
FIG. 24 shows an example Hg(II) sensing mechanism of the carbon dot of FIG. 23.
Figure 23:
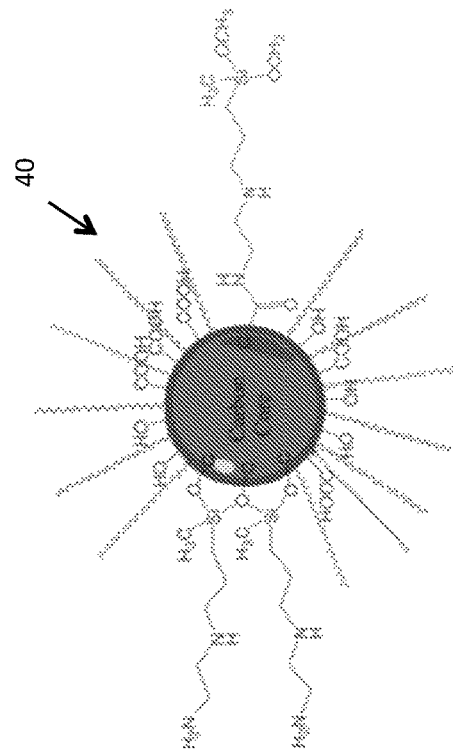
FIG. 23 shows an example of a functionalised carbon dot.

An embodiment was demonstrated to function as a fluorescence sensing platform. Polystyrene spheres of an F layer in an luminescent photonic structure E-F-E were coated with mercuric-ion sensitive carbon dots, forming a double heterostructure. FIG. 23 shows an example of the organo-silane functionalised carbon dot, which is a highly sensitive fluorescence-based Hg(II) sensing centre. The organo-silane functionalised carbon dots are described in detail in Wang et al., Journal of Colloid and Interface Science 437 (1015) 28-34. FIG. 24 shows an example Hg(II) sensing mechanism of the carbon dot of FIG. 23. It will be appreciated that other luminescent sensors instead of organo-silinae functionalised carbon dots may be used to detect other chemical substances, for example other carbon dots, metal nanoparticles, molecular dyes, quantum dopes, etc. Swelling-diffusion resulted in stable immobilization of carbon dots on the outer layer of polystyrene spheres with preserved sensitivity to Hg(II).

In use, the E-F-E structure is exposed to a fluid carrying Hg(II) ions. The fluid may be in contact with an E-layer (for example by drop casting, dip coating or flowing the fluid over a surface thereof), which is, in this embodiment, macroporous. Hg(II) infiltrates the E-layer assisted by capillary action to the F-layer to bond with the organo-silane functionalised carbon dots therein. The fluorescence is quenched or enhanced by the bonding and measured using the device of FIG. 4, for example. Alternatively, a microfluidic channel may penetrate the F-layer through which the fluid may flow. Generally any suitable delivery method may be used.

Figure 25:
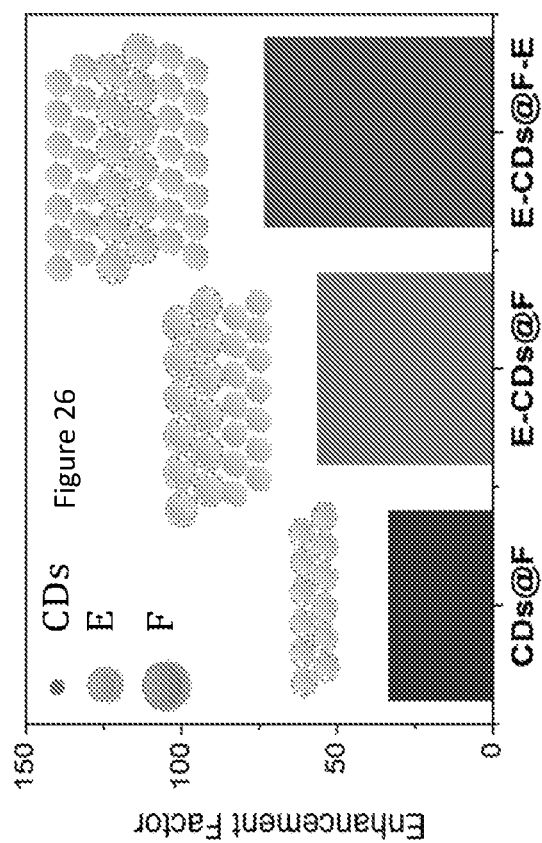
FIGS. 25-28 show results from various experiments.
Figure 26:
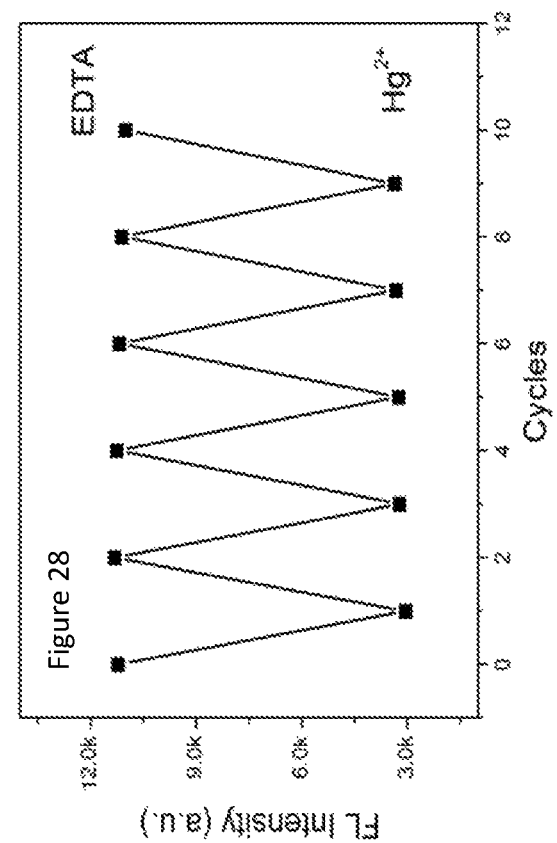
Figure 27:
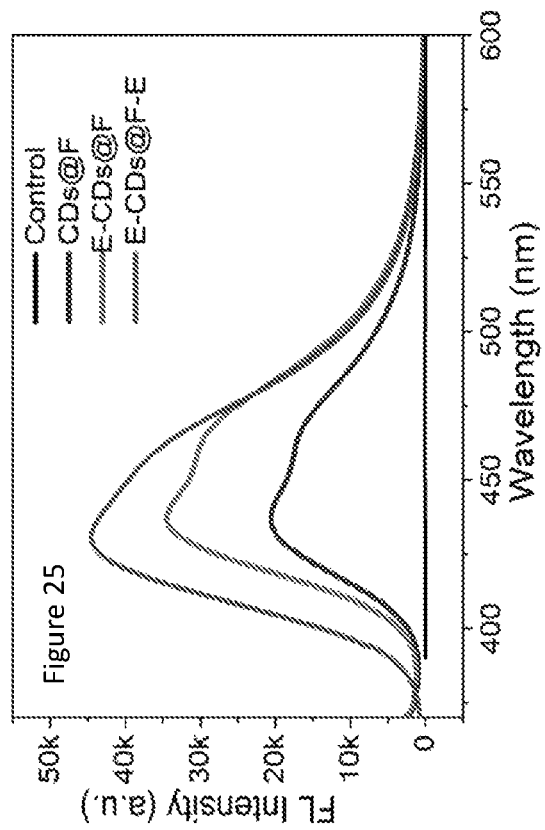

Such a E-F-E configuration had enhanced signal compared to monolithic colloidal photonic crystal structures and heterostructure. FIG. 25 shows the fluorescence spectra double heterostructure E-carbon dots s at F-E, heterostructure of E-carbon dots s at F, and single monolithic carbon dots s at F, control is carbon dots infiltrated into the amorphous polystyrene structure. FIG. 26 shows fluorescence enhancement factor for all samples, measured as the fluorescence intensity ratio between the sample and the control. A 73-fold fluorescence enhancement was observed for E-(carbon dots at F)-E, whereas a 56-fold enhancement for E-(carbon dots at F) heterostructure and 33-fold enhancement for monolithic carbon dots at F was observed. Interestingly, a different enhancement factor was obtained for Rhodamine B and carbon dots which might be attributed to the changed vibration bonds, the varied energy transfer rate and the variant polarity of the carbon dots and Rhodamine B molecules within the environment of the F layer. FIG. 27 shows a sensitivity to Hg(II) with a detection of limit of 91 pM, 14 fold lower than the detection limit of carbon dots as suspension (1.3 nM) owing to the employment of the E-F-E platform.

Figure 28:
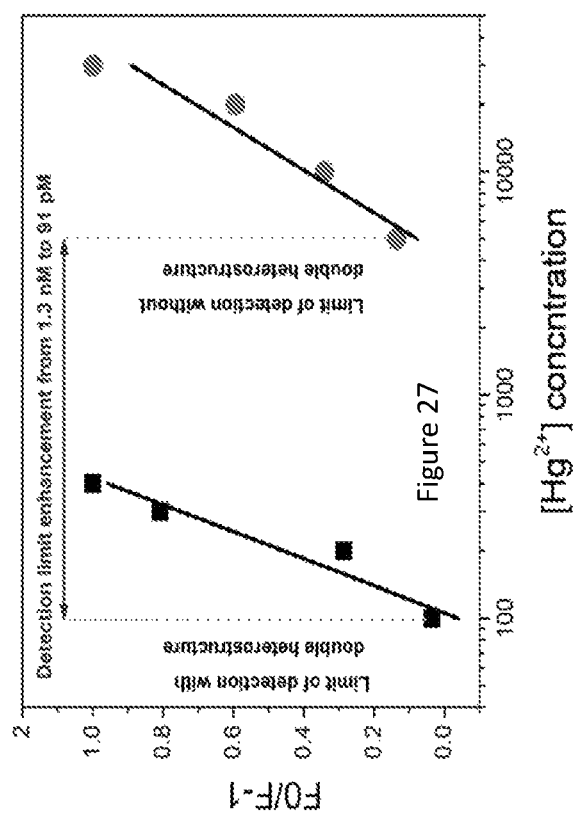

Moreover, such a cladded structure provides excellent protection to the sensing agents, namely the carbon dots coated on the surface of F polystyrene spheres; the two E layers at the top and bottom act as macroporous filters for analyte samples as well as irradiation protection. The Hg(II) may be removed with a Ethylenediaminetetraacetic acid (ETDA) bath, for example, so that the E-F-E structure can be reused for Hg(II) sensing. FIG. 28 shows reversible changes of the fluorescence intensities of the film sensor when immersed in the solution of 1.0 nM Hg(II) ions and 2 mm EDTA. The sensing device shows excellent reversibility to mercuric ion binding. It can be envisioned that if the double heterostructure are made into μm size, incorporating surface patterning to promote analyte concentration, the sensitivity and accuracy can be even further heightened.

Embodiments for sensing may generally use a chromophore/fluorophore that optically responds to an analyte. A molecule or surface ligands on a nanoparticles may interact with the analyte, either changing the molecular structures or causing charge or energy transfer, thereby changing an optical property, for example fluoresce lifetime, intensity or spectrum.

The fluorescent sensing probes that can be incorporated into the photonic crystal structures may be, for example, molecules and/or nanoparticles. Sensing molecules and/or nanoparticles may be infiltrated into the luminescent photonic structure. The sensing molecules and/or nanoparticles may be attached to the luminescent photonic structure by at least one of a van der Waals force, an electrostatic force, hydrogen bonding, Pi-Pi interactions, covalent bonding, noncovalent bonding, and mechanical entanglement of the polymer chains Embodiments of luminescent photonic structures may be configured for sensing or detection of mercury ions, phosphonates, phosphates, nitrates, nitrite, endocrine disruptive chemicals, phenols, chlorophenols, hormones, elicit drugs, or generally any target species.

An advantage of spherical colloidal photonic crystal structures may be their dispersity like conventional colloidal suspension, and higher diffusion flux owing to radial diffusion. Optically, these round photonic crystals exhibit an isotropic bandgap, which means for a fixed incident light source, the stop band is independent of the rotation of spheres.

The semiconductor material bandgap can be matched with the photonic bandgap, for example, (e.g. the blue edge of photonic bandgap). Multilayered round photonic crystals and inverse round photonic crystals may allow a sequence of semiconductor materials to be wrapped together like an 'onion', with the highest bandgap energy material as the first surface layer and gradually decrease toward inside. This sequence may be advantageous because the fact that the longer the light wavelength, the deeper its penetration.

Figure 30:
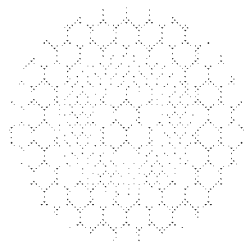
FIG. 30 shows a sectional view of an embodiment of a luminescent photonic structure that is the inverse of the luminescent structure of FIG. 29.
Figure 29:
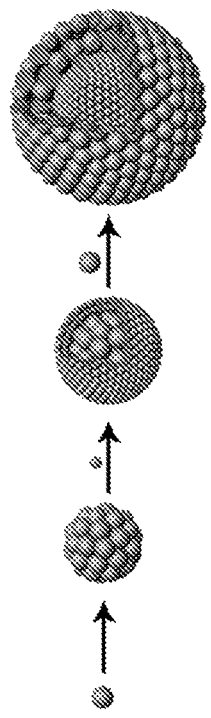
FIG. 29 shows a core and out layers of an embodiment of a luminescent photonic structure having a spherical geometry.

FIG. 29 shows the core and layers of the double heterostructure round luminescent photonic structure and FIG. 30 shows the cross sectional view of the inverse structure of the complete round photonic crystal.

Figure 31:
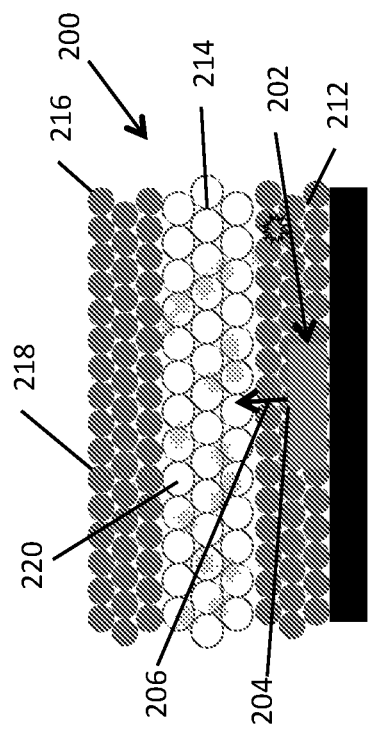
FIG. 31 shows another embodiment of a luminescent structure comprising a light emitting device.

Applications Associated with Light Emitting Diodes and Other Light Emitting Devices FIG. 31 shows another embodiment of a luminescent photonic structure 200 comprising a light emitting device in the form of a light emitting diode 202

The luminescent photonic structure 200 comprises a luminescent material 214 that when excited by excitation light 206 emitted by the light emitting diode 202 and having a wavelength within an excitation wavelength spectrum of the luminescent material emits luminescent light having a luminescence wavelength spectrum. The luminescent photonic structure 200 has a photonic crystal 214 disposed between the two other photonic crystals 212, 216. The photonic crystal 214 has a photonic lattice period within the luminescence wavelength spectrum. The two other photonic crystals 212, 216 have a photonic lattice period within the excitation wavelength spectrum for reflecting excitation light propagating within the photonic crystal 214. The luminescent photonic structure 200 may generally be any suitable luminescent photonic structure including any of the embodiments described herein that are suitable, including sensing embodiments.

At least a part of the light emitting diode 202 is incorporated within one of the other two photonic crystals 212, 216. A light-emitting surface 204 of the light emitting diode 202 is orientated for emitting the excitation light 206 into the interior of the luminescent structure 200.

Figure 32:
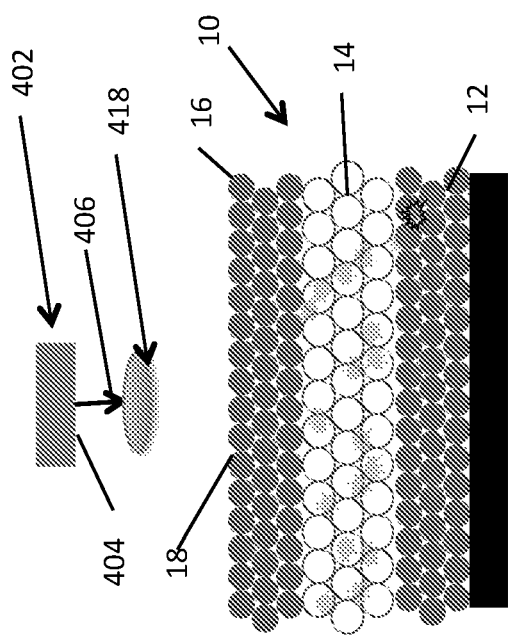
FIG. 32 shows the luminescent photonic structure of FIG. 31 having a light emitting diode optically coupled thereto.

FIG. 32 shows a light emitting diode 402 optically coupled to the luminescent photonic structure 10. The light emitting diode 402 is external to, and in this embodiments spaced apart from, the luminescent photonic structure 10. In an alternative embodiment, the light emitting diode 402 may be abutted with the luminescent photonic structure 10. The excitation light 406 emitted by the light emitting diode coupled into the luminescent photonic structure may be optionally coupled using optics 418, for examples at least one lens 418, waveguides, photonic crystals or generally any suitable optics.

FIG. 33 shows a plot of the emission spectra of the embodiment of FIG. 31. The double heterostructure significantly enhances emission intensity. When used in combination with a broad-colour converting agent, the parameters of the photonic crystal and other two photonic crystals may be selected to convert the output wavelength of the light emitting diode to another wavelength. This may be achieved more efficiently than by using phosphors in a traditional manner (i.e. a coating), improving overall device efficiency and consequently may result in energy savings or increased brightness for the same power. FIG. 34 shows an elevational diagram of another embodiment of a luminescent photonic structure 300 comprising a light emitting device. The light emitting device, in this but not all embodiments, is in the form of a light emitting diode 302. The light emitting surface 304 of the light emitting diode is abutted to an outside surface 306 of the luminescent photonic structure 300. The outside surface 306 is a flat surface of the luminescent photonic structure 300, which has a plurality of shell-layers, as descried with reference with FIGS. 20-22 and 29-30. FIG. 35 shows a cross section of the luminescent photonic structure of FIG. 33, revealing an inverse-opal structure, although generally any suitable structure may be used.

The luminescent photonic structure 300 comprises a luminescent material 314 that when excited by excitation light emitted by the light emitting diode 302 and having a wavelength within an excitation wavelength spectrum of the luminescent material emits luminescent light having a luminescence wavelength spectrum. The luminescent photonic structure 300 has a photonic crystal 314 disposed between other photonic crystals 312, 316. The photonic crystal 314 has a photonic lattice period within the luminescence wavelength spectrum. The two other photonic crystals 312, 316 have a photonic lattice period within the excitation wavelength spectrum for reflecting excitation light propagating within the photonic crystal 314. The luminescent photonic structure 300 may generally be any suitable luminescent photonic structure including any of the embodiments described herein, including sensing embodiments.

The diameter of the photonic elements in the form of spheres (or spherical holes) 218, 318 may be selected for overlap of a bandgap/partial bandgap of the two other photonic crystals 212, 216, 312, 316 with the emission spectrum of the light emitting diode 202, 304. The bandgap/partial bandgap may overlap with a blue edge of the two other photonic crystals 212, 216, 312, 316. The diameter of the photonic elements in the form of spheres (or spherical holes) 220, 320 are selected for overlap of the bandgap/partial bandgap of the photonic crystals 214,314 with the emission spectrum of the luminescent material 214, 314. The bandgap/partial bandgap may overlap with a blue edge of the photonic crystals 214, 314.

The luminescent material 214, 314 may comprise phosphors including but not limited to $Ce^{3+}$:YAG, $Ce^{3+}$:$Y_3Al5O_{12}$, lanthanides including but not limited to neodymium, terbium, gadolinium, ytterbium, erbium, rare-earth doped SiAlON for example Europium(II)-doped β-SiAlON, a mixture of high efficiency europium based red and blue emitting phosphors plus green emitting copper and aluminium doped zinc sulfide (ZnS:Cu,Al), quantum dots, carbon dots, or generally any suitable material.

Figure 36:
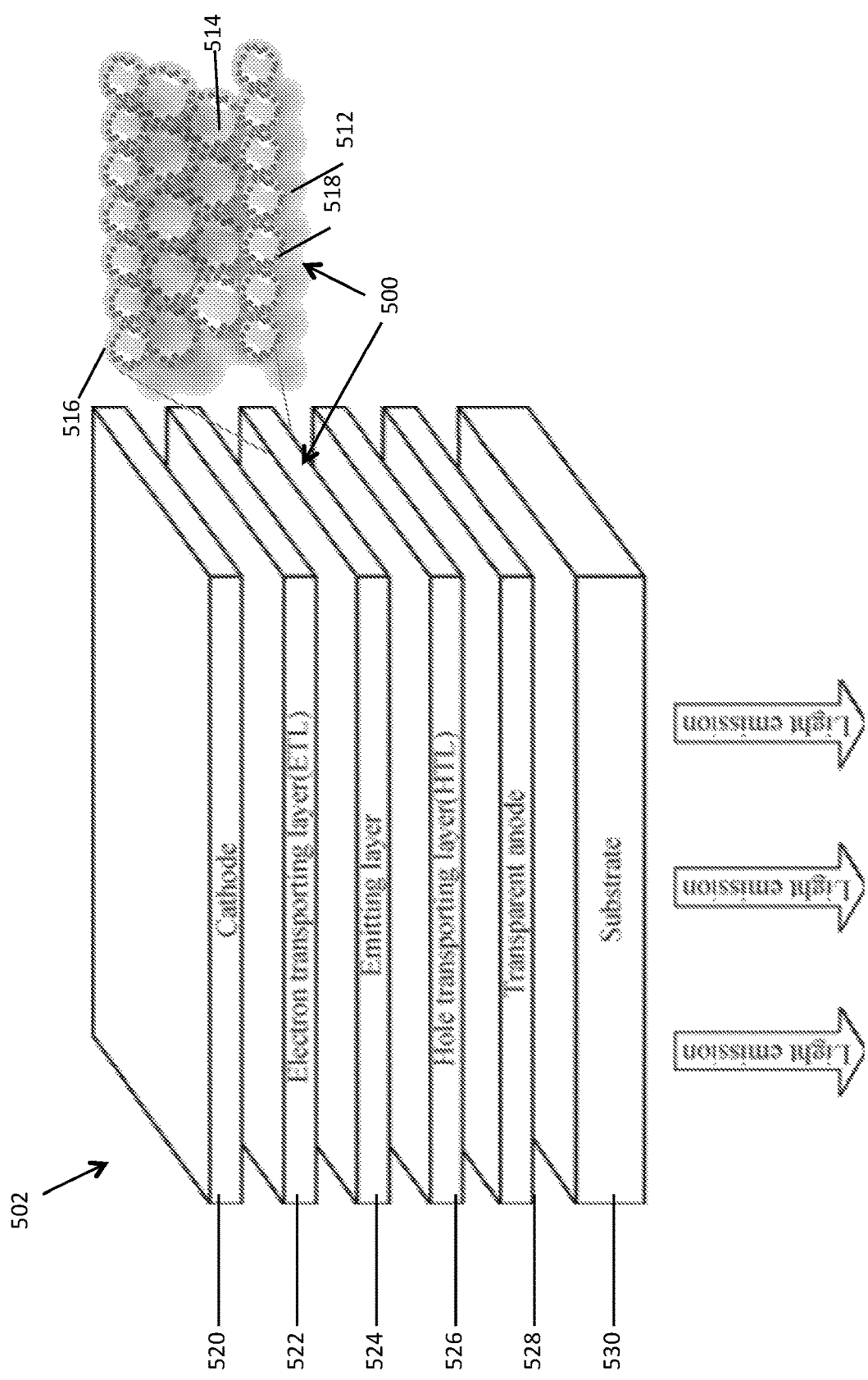
FIG. 36 shows another embodiment of a luminescent photonic structure.

FIG. 36 shows a perspective exploded view of another embodiment of a luminescent photonic structure 502. The luminescent photonic structure comprises a light emitting diode in the form of an organic light emitting diode (OLED) 502. The OLED 502 has a plurality of layers including a cathode layer 520, an electron transporting layer 522, an emitting layer 524 comprising a luminescent photonic structure 500, a hole transporting layer 526, a transparent layer 528, and a substrate 530, however alternative architectures may be used. The luminescent photonic structure 500 comprises a double E-F-E heterostructure 500, having the same or similar function to that of FIG. 1, and comprises a plurality of photonic elements in the form of spheres in the layers 212, 214, 216 and fluorophores 518 at the outer surface of the plurality of spheres. Table 1 discloses materials that may be used for the OLED 502 layers.

Figure 37:
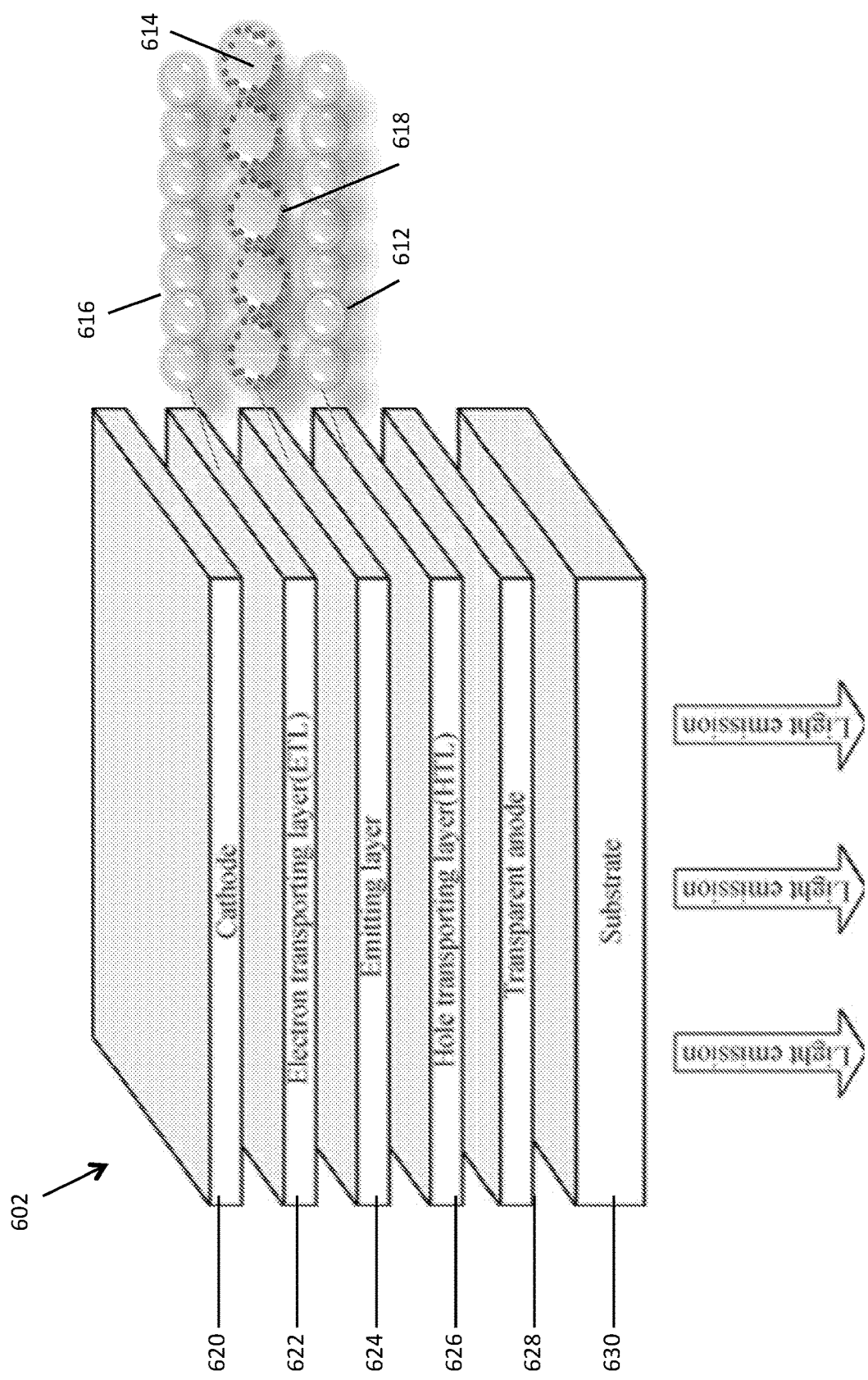
FIG. 37 shows another embodiment of a luminescent photonic structure.

FIG. 37 shows a perspective exploded view of another embodiment of a luminescent photonic structure 602. The luminescent photonic structure comprises a light emitting diode in the form of an organic light emitting diode (OLED) 602. The OLED 602 has a plurality of layers including a cathode layer 620, an electron transporting layer 622, an emitting layer 624, a hole transporting layer 626, a transparent layer 628, and a substrate 630, however alternative architectures may be used. The emitting layer 624 comprises a photonic crystal. The electron transporting layer 622 and hole transporting layer 626 comprise other photonic crystals. The combined layers 622, 624 and 626 have similar features and/or properties to the combined layers 12,14,16 of the luminescence photonic structure 10 of FIG. 1 described above. Table 1 discloses materials that may be used for the OLED 602 layers.

In the embodiments of FIGS. 36 and 37, the luminescent material comprises a plurality of carbon dots. The plurality of carbon dots are disposed in the photonic crystal and/or the other photonic crystal. In these but not all embodiment, the carbon dots are functionalised with 3-(imidazolidin-2-on-1-yl)propylmethyldimethoxysilane-derived moieties (IS-CDs).

IS-CDs were synthesized by reacting 3-(2-aminoethylamino)propyldimethoxymethylsilane (AEPMDS, Beijing Shenda Fine Chemical, China) with urea (Chem-Supply, Australia) and a nanoparticle scaffolding synthon, citric acid, in a molar ratio of AEPMDS:urea:citric acid=19:5:1. Typically, urea (1.5 g) was added to AEPMDS (20 mL in a 50 mL three-neck flask) and the mixture heated to reflux (220° C.), under $N_2$. After 30 minutes, anhydrous citric acid (1 g) was introduced via a solid addition device. The reaction temperature (220° C.) was maintained for a further 30 minutes. The cooled reaction mixture, containing the synthesized crude CDs was washed with hexane (7×50 mL, RCI Labscan, Australia) in order to initially remove excess AEPMDS and then to fractionate organosilane functionalized CDs (OS-CDs). The OS-CDs could be isolated from the combined hexane fractions, by evaporation at reduced pressure. The hexane insoluble residue remaining after the hexane washes contained the IS-CDs. For characterization, the IS-CDs were prepared by dissolution of the IS-CDs in a polar solvent such as MeOH or DMSO.

Freestanding solid IS-CDs were prepared by drop casting IS-CDs onto glass slides (25 mm×55 mm). Freshly synthesized IS-CDs were washed copiously with hexane and then dried (evaporation at reduced pressure; 40° C.). 400 μL aliquots of neat, gelatinous, IS-CDs were then dropped onto the slides. The slides were then oven dried (70° C., 0.5 h) and then left to age in a dust free environment (7 d). The solid films were extracted from the glass substrates by scrapping with a utility knife blade. Solid IS-CDs were prepared by drop casting the IS-CDs (40 μL) onto glass slides (10 mm×12 mm). The coated glass slides were then oven dried (70° C., 0.5 h).

The distinctive yellow emission of IS-CDs, upon blue excitation, is in the applicant's opinion from the surface states' absorption and emission. *Artemia franciscana nauplii* toxicity tests show that IS-CDs are non-toxic. The IS-CDs show consistent optical performance in the solid state. Their high quantum yield and maximum emission in the blue spectral range, along with the simplicity of solid sample fabrication, enabled utilization of the IS-CDs as phosphors for light emitting devices including but not limited to light emitting diodes. The color of generated light may be controlled by varying the density of IS-CDs, and a natural white light colour may be produced. Light emitting devices incorporating IS-CDs present new possibilities for the construction of environmentally responsible solid state lighting technologies, due to their non-toxicity, the ease with which derived devices could be fabricated and their relative cost effectiveness.

The OLEDs 502, 602 are yet other embodiments of a luminescent photonic structure, where the excitation light is self generated.

The light emitting device described above may take any suitable form, for example an organic light emitting diode (OLED), a quantum-dot light emitting diode (QLED), a carbon-dot light emitting diode (CLED), a solid-state and/or semiconductor laser, an electric discharge lamp, an electroluminescence device, or generally any suitable light emitting device.

TABLE 1

Materials for OLED layers

| Layer | Material |
| --- | --- |
| Anode | Indium tin oxide |
| | Indium zinc oxide |
| | Aluminum zinc oxide |
| | Cadmium tin oxide |
| | Tin oxide |
| | Zinc oxide |
| Hole transporting layer | 4,4'-bis[N-(1-naphthyl)-N-phenylamino]biphenyl (NPB) |
| | 4,4'-bis[N-(3-methylphenyl)-N-phenylamino]biphenyl (TPD) |
| | 4,4'-bis[N-(1-naphthyl)-N-(2-naphthyl)amino]biphenyl (TNB) |
| | 4'-carbozol-9-yl-biphenyl-4-yl-naphthalen-1-yl-phenyl-amine (NCB) |
| | Bis(4-dimethylamino-2-methylphenyl)-phenylmethane (MPMP) |
| | 3,3'-dimethyl-N,N,N',N'-tetra-m-tolyl-biphenyl-4,4'-diamme (HMTPD) |
| | 4,4',4''-tris[(3-methylphenyl)phenylamino]triphenylamine (MTDATA) |
| | N,N'-di-phenanthren-9-yl-4,N'-diphenyl-biphenyl-4,4'-diamine (PPB) |
| | Tris(4-carbazol-9-yl-phenyl)amine (TCTA) |
| Emitting layer | Dopants for host material (Complexes of iridium, platinum, europium and ruthenium) |
| | Dopants for host materials (complex of iridium, platinum, europium or ruthenium) |
| | Dichlorotris(1,10-phenanthroline)ruthenium(II) hydrate |
| | Lithium tetra(2-methyl-8-hydroxyquinolinato)boron |
| | Platinum octaethylporphyrin |
| | Tris(2,2'-bipyridyl)dichlororuthenium(II) hexahydrate |
| | Tris(2,2'-bipyridyl-d8)ruthenium(II) hexafluorophosphate |
| | Tris(benzoylacetonato) mono(phenanthroline)europium(III) |
| | Tris(1-phenyl-3-methyl-benzoimidazolin-2-ylidene-C,C') iridium(III) |
| | Iridium(III) bis[(4,6-difluorophenyl)-pyridinato-N,C']picolinateLight emitting polymers |
| | Light emitting polymers |
| | Cyano-polyphenylene vinylene (CN-PPV) |
| | Poly(fluorenylene ehtynylene) (PFE) |
| | Poly(phenylene ethynylene) (PPE) |
| | Polyfluorene (PFO) |
| | Polyfluorene-vinylene (PFV) |
| | Polyphenylene vinylene (PPV) |
| Electron transporting layer | 1,3,5-tris(N-phenylbenzimidazol-2-yl)benzene (TPBi) |
| | 2-biphenyl-4-yl-5-(4-tert-butyl-phenyl)-[1,3,4]oxadiazole (PBD) |
| | Tris(8-hydroxyquinoline) aluminum (Alq3) |
| | 4,7-diphenyl-[1,10]phenanthroline (DPA) |
| | 4-naphthalen-1-yl-3,5-diphenyl-4-[1,2,4]triazole (TAZ-1) |
| | 3,4,5-triphenyl-4-[1,2,4]triazole (TAZ-2) |
| | Indium trisoxine [alias, tris(8-quinolinolato)indium] |
| | Lithium oxine [alias, (8-quinolinolato)lithium(I)] |
| | Zirconium oxine [alias, tetra(8-quinolinolato)zirconium(IV)] |
| Cathode | Magnesium-aluminum |
| | Magnesium-silver |
| | Magnesium-indium |
| | Aluminum-lithium |
| | Lithium fluoride |
| | Aluminum |

In summary, the applicants have shown that at least some embodiments of a luminescent photonic structure 10 can enhance the directional emission of optically excited fluorescence. The outer E-layers may act as an optical resonator for the excitation light, enhancing the excitation rate of fluorophores in the central F-layer.

At the same time, the F-layer leaky mode may be in resonance with the fluorescence emission. The coupling of the two resonance modes may cause fluorescence intensity enhancement, in relation to E and F monolithics. The emission dynamics study suggests that the fluorescence enhancement is consistent with a photonic effect, and that the majority of the fluorescence enhancement may take place in the middle F layer due to the coupling of multiple beam interference with the stop band of E layers. Doubly resonant colloidal photonic crystal structures, which may be fabricated through facile self-assembly route with inexpensive materials, may find applications including illumination, light harvesting, and chemical/biochemical sensing.

Now that embodiments have been described, it will be appreciated that some embodiments may have some of the following advantages:

Optical sensing embodiments may have at least one of high sensitivity, fast detection speed, and compatibility with portable devices.

Embodiments associated with light emitting devices may increase at least one of energy efficiency, light intensity, colour tunability, and light directional shaping.

Variations and/or modifications may be made to the embodiments described without departing from the spirit or ambit of the invention. While the photonic crystals describes herein are synthetic opals comprising polystyrene, they may be fabricated of any suitable material, for example silica spheres. The luminescent photonic structure may have an inverse opal structure. The photonic crystal and the two other photonic crystals may not be colloidal photonic crystals. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A luminescent photonic structure comprising:
   a luminescent photonic crystal having a repeated structure in three-orthogonal directions that when excited by an excitation light having a wavelength within an excitation wavelength spectrum of the luminescent material emits luminescent light having a luminescence wavelength spectrum;
   the luminescent photonic crystal being disposed between two other photonic crystals that are each colloidal photonic crystals having a repeated structure in three-orthogonal directions, the luminescent photonic crystal having a photonic lattice period within one of the luminescence wavelength spectrum and the excitation wavelength spectrum, and the two other photonic crystals each having a photonic lattice period within the other of the luminescence wavelength spectrum and the excitation wavelength spectrum for reflecting one of the excitation light and the luminescent light propagating within the luminescent photonic crystal, wherein the luminescent photonic crystal is configured for constructive multiple beam interference of the excitation light.

2. A luminescent photonic structure defined by claim 1, wherein the thickness of the photonic crystal is selected to support constructive multiple beam interference of the excitation light.

3. A luminescent photonic structure defined by claim 2, wherein the thickness of the photonic crystal satisfies $T=m\lambda \cos\theta_2$, where m is an integer, $\lambda$ is the wavelength of the excitation light, $\theta_1$ is the incident angle of the excitation light with respect to a normal of the photonic crystal, and $\theta_1$ and $\theta_2$ satisfy $$\frac{n_1}{n_2} = \frac{\sin\theta_2}{\sin\theta_1},$$

where $n_1$ is the refractive index of the two other photonic crystals, and $n_2$ is the refractive index of the photonic crystal.

4. A luminescent photonic structure defined by claim 1, wherein the photonic crystal has a partial photonic band gap overlapping the luminescent emission spectrum of the luminescent material.

5. A luminescent photonic structure defined by claim 1, wherein the luminescent material comprises the photonic crystal.

6. A luminescent photonic structure defined by claim 5, wherein the luminescent material comprises at least one of the two other photonic crystals.

7. A luminescent photonic structure defined by claim 1, wherein the luminescent material comprises a plurality of luminescent centers.

8. A luminescent photonic structure defined by claim 7, wherein the plurality of luminescent centers are within the photonic crystal.

9. A luminescent photonic structure defined by claim 7, wherein the plurality of luminescent centers are within the photonic crystal and the two other photonic crystals.

10. A luminescent photonic structure defined by claim 7, wherein the plurality of luminescent centers comprise a plurality of fluorophores.

11. A luminescent photonic structure defined by claim 10 wherein the plurality of fluorophores comprise at least one of a plurality of luminescent ions, a plurality of luminescent molecules, a plurality of luminescent nanoparticles and a plurality of up-conversion centers.

12. A luminescent photonic structure defined by claim 11, wherein the plurality of luminescent ions comprise a plurality of lanthanide ions.

13. A luminescent photonic structure defined by claim 11 wherein the plurality of luminescent molecules comprise a plurality of laser dye molecules.

14. A luminescent photonic structure defined by claim 13 wherein the plurality of laser dye molecules comprises Rhodamine B.

15. A luminescent photonic structure defined by claim 1, wherein the luminescent material comprises at least one of a luminescent dye and a plurality of nanoparticles for fluorescence energy transfer (FRET).

16. A luminescent photonic structure defined by claim 1, wherein the luminescent material comprises a fluorescent sensing material.

17. A luminescent photonic structure defined by claim 16 wherein the fluorescent sensing material comprises a fluorescent chemical sensing material.

18. A method for sensing a chemical substance, the method comprising the steps of:
   determining a luminescence property of a luminescent photonic structure defined by claim 1;
   transporting the chemical substance to the luminescence material and modifying the luminescence material with the chemical substance transported thereto;
   determining the luminescence property of the luminescent photonic structure.

* * * * *